(12) United States Patent
Nadella et al.

(10) Patent No.: US 7,655,728 B2
(45) Date of Patent: Feb. 2, 2010

(54) PREPARATION OF THERMOPLASTIC ELASTOMERS BY DYNAMIC VULCANIZATION IN MULTI-SCREW EXTRUDERS

(75) Inventors: Hari P. Nadella, Copley, OH (US); Jianya Cheng, Fairlawn, OH (US); Ronald DeYoung, Westfield Center, OH (US); Kuo-Shein Shen, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 312 days.

(21) Appl. No.: 11/167,339

(22) Filed: Jun. 27, 2005

(65) Prior Publication Data

US 2006/0293457 A1 Dec. 28, 2006

(51) Int. Cl.
C08L 23/00 (2006.01)
C08L 23/10 (2006.01)
C08F 8/00 (2006.01)

(52) U.S. Cl. ............... 525/191; 525/192; 525/203; 525/216; 525/232; 525/240; 525/241; 525/242; 525/263; 264/425

(58) Field of Classification Search ............... 525/192, 525/191, 232, 240, 263, 342, 203, 216, 241, 525/242; 264/425; 366/82–85
See application file for complete search history.

(56) References Cited

U.S. PATENT DOCUMENTS

| | | | |
|---|---|---|---|
| 2,631,727 A | 12/1949 | Cichelli | |
| 2,765,282 A | 10/1956 | Elliott | |
| 2,859,170 A | 11/1958 | Dickens et al. | |
| 4,130,535 A | 12/1978 | Coran et al. | |
| 4,176,967 A * | 12/1979 | Brinkmann et al. | 366/83 |
| 4,311,628 A | 1/1982 | Abdou-Sabet et al. | |
| 4,594,390 A | 6/1986 | Abdou-Sabet | |
| 4,940,830 A | 7/1990 | Zinnen et al. | |
| 5,108,711 A * | 4/1992 | Chszaniecki | 422/135 |
| 6,147,160 A | 11/2000 | Wang et al. | |
| 6,210,030 B1 * | 4/2001 | Ibar | 366/78 |
| 6,299,340 B1 * | 10/2001 | Lu et al. | 366/76.3 |
| 6,437,030 B1 * | 8/2002 | Coran et al. | 524/101 |
| 6,610,786 B1 | 8/2003 | Itoh | |
| 7,025,491 B2 * | 4/2006 | Blach et al. | 366/85 |
| 7,040,798 B2 * | 5/2006 | Innerebner et al. | 366/76.3 |
| 7,284,897 B2 * | 10/2007 | Blach | 366/75 |
| 7,407,611 B2 * | 8/2008 | Innerebner et al. | 264/141 |
| 2004/0094862 A1 * | 5/2004 | Sturm et al. | 264/211 |
| 2005/0043484 A1 | 2/2005 | Wang et al. | |
| 2005/0085591 A1 | 4/2005 | Dozeman et al. | |
| 2005/0089595 A1 | 4/2005 | Black | |
| 2005/0140049 A1 | 6/2005 | James et al. | |
| 2006/0293458 A1 * | 12/2006 | Chung et al. | 525/192 |
| 2007/0043172 A1 * | 2/2007 | Ellul et al. | 525/192 |

FOREIGN PATENT DOCUMENTS

| | | |
|---|---|---|
| DE | 3 541 414 | 5/1987 |
| EP | 0 072 203 * | 2/1983 |
| EP | 0 109 375 | 12/1986 |
| EP | 0 320 001 | 6/1989 |
| EP | 0 436 724 | 7/1991 |
| EP | 0 547 843 B1 | 12/1992 |
| EP | 0 574 040 | 12/1993 |
| EP | 0892 831 B1 | 3/1997 |
| WO | WO 03/031150 A1 | 10/2002 |
| WO | WO 2005/010094 A1 | 2/2005 |
| WO | 2005/028555 | 3/2005 |

OTHER PUBLICATIONS

Vorberg et al., "Compoundieren mit zwölf Wellen Ringextruder zeigt Vorteile gegenüber der Doppelschnecke," vol. 90, No. 8. Aug. 2000, 60-62, XP000963682.
Coran, A. Y., "Vulcanization," Chap. 7, Science and Technology of Rubber, Eirich, F. R., Ed., Academic Press, Inc., 1978, p. 292.
Abraham et al., "Thermoplastic Elastomers: Fundamentals and Applications," Chap. 5, Rubber Compounding: Chemistry and Applications, B. Rodgers, Ed., Marcel Dekker, 2004.
Related, copending U.S. Appl. No. 11/375,737, filed Mar. 15, 2006, Entitled, "Dynamic Vulcanization Process for Preparing Thermoplastic Elastomers", Inventor H. Nadella et al.

* cited by examiner

*Primary Examiner*—Irina S Zemel

(57) ABSTRACT

The invention relates to a method of preparing a thermoplastic vulcanizate comprising: a) melt processing a blend of thermoplastic polymer and vulcanizable elastomer in a multi-screw extruder having at least three intermeshing screws, wherein said screws have 3-170 mixing zones, and said extruder having a L/D ratio of 15-100, and a screw profile that has 3 to 17 meshes per L/D; b) adding at least one curing agent to the melt-processed blend of a) in at least one location in the first 46% of the length of said extruder, or adding at least one curing agent to the melt-processed blend of a) in a second extruder, so as to initiate curing of the blend: and, curing at least partially said elastomer by reactive melt processing. Improved processing, reaction kinetics and efficiencies are achieved, as well as thermoplastic vulcanizate products having decreased weight gain when placed in mineral oils.

13 Claims, 4 Drawing Sheets

PREPARATION OF THERMOPLASTIC ELASTOMERS BY DYNAMIC VULCANIZATION IN MULTI-SCREW EXTRUDERS

FIELD OF THE INVENTION

The present invention relates to a process for the mixing of thermoplastic polymers and cross-linkable rubbers to prepare thermoplastic elastomers, comprising melting and mixing a thermoplastic polymer, preferably a polyolefin, and a cross-linkable rubber. The cross-linkable rubbers in a blend formed by the mixing may be dynamically cross-linked during the mixing, or the rubber may dynamically cross-linked in subsequent melt processing, with the addition of cross-linking agents.

BACKGROUND OF THE INVENTION

Dynamically vulcanized thermoplastic elastomers (thermoplastic vulcanizates) have a combination of both thermoplastic and elastic properties. Such thermoplastic vulcanizates are prepared by mixing and shearing a thermoplastic polymer, a vulcanizable rubber and a curing agent. The vulcanizable rubber is cured and is intimately and uniformly dispersed as a particulate phase within a continuous phase of the thermoplastic polymer.

Thermoplastic vulcanizates can be pressed and shaped into useful products using conventional plastic processing equipment. Thermoplastic vulcanizates can be made light in weight and attractive, with good durability, and can be reprocessed at the end of their product life to produce a new product. For these reasons, thermoplastic vulcanizates are widely used in industry, for example as auto parts, such as dashboards and bumpers, air ducts, seals and other under the hood applications; as gears and cogs, wheels and drive belts for machines; as cases and insulators for electronic devices; as fabric for carpets, clothes and bedding and as fillers for pillows and mattresses; and as expansion joints for construction.

In many applications where complete cross linking of the elastomer is desired, such as in seals and under the hood applications in the automotive industry, where oil and gasoline may cause swelling of the vulcanizate, limitations in prior art processing required the use of excessive amounts of curing agents. The excess curing agents, needed to insure complete cross linking may exude into the atmosphere, causing a health hazard or discomfort to those handling the material in addition to extra costs and inefficiencies. Additionally, the use of different curing agents, desirable for differentiated products suitable for different applications, typically requires modification of the screw elements, input ports, temperature profiles, and the like for optimal production. Any opportunity to decrease need for change in this manner would be of great benefit for manufacturers.

Thermoplastic vulcanizates can be prepared dynamically in Banbury mixers and other types of shearing mixers. Because of the advantages of a continuous process, such materials are often prepared in twin screw extruders. Twin screw extruders are available having screw diameters from 25 mm to about 380 mm. The larger extruders are the result of continuous progress toward increasing output. The extruders having the large screw diameters have a reduced surface area, relative to the output of the extruder, compared to extruders having screws with smaller diameters. Mixing in the larger extruders can be increased by increasing their length, but an increase in extruder length can increase material degradation. Consequently, the economies of scale offered by the larger extruders are not realized for all materials.

WO 03/031150 A1 teaches a method of using a twin screw extruder, which is said to reduce the occurrence of black specks in a dynamically vulcanized thermoplastic elastomer. The method describes the use of the extruder at 700 to 1100 RPM to solve the black speck problem. The publication teaches that the dynamically vulcanized thermoplastic elastomer may contain 65-95% by weight elastomer.

U.S. Pat. No. 4,594,390 teaches that dynamic vulcanization can take place in 20 to 60 seconds in a twin screw extruder at 100-500 RPM. The extrudate is said to be kneaded 1-30 times/second by each element, and is kneaded 200 to 1800 times for vulcanization to take place. The thermoplastic polymer and the elastomer are mixed in the first ⅓ of the extruder, catalyst is added at ⅓ of the extruder length from the feed throat, and dynamic vulcanization is carried out in the final ⅔ of the extruder length. Shear rates of at least 2000 $sec^{-1}$ to 7500 $sec^{-1}$ are described, EP 0 547 843 B1 teaches at page 5, lines 7-10 that continuous single screw kneading extruders, twin screw kneading extruders, or kneading extruders with three screws or more, can be used for processing dynamically vulcanized thermoplastic elastomers. A twin screw extruder is described in EXAMPLES 1-4, and a super mixer is disclosed in EXAMPLE 4. The description does not indicate whether the screws in the extrusion are co-rotating, counter rotating or intermeshing.

U.S. Pat. No. 6,610,286 B1 describes a thermoplastic elastomer exhibiting scarce tendency of depositing gummy crust around the extrusion die upon extrusion. The patent alleges articles having superior oil resistance can be formed from the extrudate, and at column 4, recites a broad range of 5-70% by weight PP (polypropylene), where the total amount of PP and vulcanized oil-extended rubber in the composition is used for calculating the percentage. It is noted that in the examples, the least amount of PP shown in the compositions is 20% (25.9% excluding the oil extenders), and such materials are not isolated, but are intermediate materials that are projected to have been formed in processing.

WO 2004/009327 A1 describes a ring extruder having twelve intermeshing, co-rotating screws arranged around an inner core, and surrounded by a barrel. In their product brochure, 3+Extruder GmbH, Hoher Steg 10, 74348 Lauften, Germany, compares their Ring Extruder (RE) with twin screw extruders (TS), and claims better product quality with a higher throughput, and better cost efficiency. The large number of screw shafts are said to increase drive power and volume, and to provide easier and gentler mixing with less product degradation, and the barrel arrangement is said to provide efficient venting. The lengths of the barrels are based on the diameter of the screws designed for use in the barrel, and a feed barrel has a length of 3D (D is diameter), solid barrels have a length of 4D, and combination barrels have a length of 2D. Accordingly, in a ring extruder using mixing screws having a diameter of 30 mm, the feed barrel has a length of 90 mm, the solid barrel has a length of 120 mm, and the combination barrel has a length of 60 mm. The ring extruder is said to have advantages in that it can be made shorter because of the increased mixing capability of the increased number of screws, and equivalent output with smaller diameter screws provides advantages for heat transfer, mixing and degassing.

SUMMARY OF THE INVENTION

The described invention addresses the above problems, and others, and is a method of preparing a thermoplastic vulcanizate comprising: a) melt processing a blend of thermoplastic polymer and vulcanizable elastomer in a multi-screw extruder having at least three intermeshing screws, wherein said screws have 3-170 mixing zones, and said extruder having a L/D ratio of 15-100, and a screw profile that has 3 to 17 meshes per L/D; b) adding at least one curing agent to the melt-processed blend of a) in at least one location in the first 46% of the length of said extruder, or adding at least one curing agent to the melt-processed blend of a) in a second extruder, so as to initiate curing of the blend: and, c) curing at least partially said elastomer by reactive melt processing.

Various curing agents may be used in the method, and in a first embodiment, the curing agent is a silicon-hydride composition and a platinum catalyst therefor. In another embodiment, the curing agent is selected from the group consisting of phenolic resins and organic peroxide compositions wherein the curing agent is added in the first 25% of the length of the first extruder.

In the method, the ring extruder is one wherein each screw is adjacent to two other screws; and, preferably the screws surround a core and a barrel surrounds the screws. In one embodiment the ring extruder may be divided into mixing portions using two or more non-rotating shafts adapted to block cross-over of extruding material from one portion of the ring extruder to another. And in a further variation of the embodiment, co-rotating shafts may be adapted to block cross-over of material for a portion of the L/D of the extruder, and adapted to be intermeshing for a portion of the L/D of the extruder.

In a preferred embodiment, the method further comprises rotating the screws at 100 to 1200 RPM and feeding material to the extruder at a rate of 1.91-22.9 Kg/(Hr×cm$^2$ free cross sectional area), and preferably rotating the screws at 250 to 850 RPM and feeding material at a rate of 4.78-16.22 Kg/(Hr×cm$^2$ free cross sectional area). Preferably, the screws of the extruder will be rotated at 500 to 850 RPM, material will be fed to the extruder at a rate of 9.54-16.22 Kg/(Hr×cm$^2$ free cross sectional area), and 770 to 2900 intermeshes-sec$^{-1}$ per L/D will be provided to a mixture in the extruder.

In another embodiment, the method comprises dynamically curing an elastomer and adding curing agents to the mixture in the amount of 75% to less than 100% by weight of the total weight of curing agents required to process the same materials in a twin screw extruder.

In the method, the properties of the vulcanizate may be further modified by adding free oil and extender oil in a ratio of oil/thermoplastic polymer of 160:1 to 1:20 at one or more locations before, during or after cure. Likewise, properties can be modified by adding thermoplastic polymer at the feed throat. The method can be practiced wherein a portion of the thermoplastic polymer is added at the feed throat and one or more portions are added in at least one additional locations on the extruder after the addition of curative. Alternatively the method can be practiced wherein thermoplastic polymer is added in at least one location on the extruder before the addition of curative.

The process as described is capable of providing thermoplastic vulcanizate products having a full range of hardness, e.g., from about Shore A 5 to Shore D 50, where the thermoplastic vulcanizate comprises 2.4% to 85% thermoplastic polymer, where the percentage of thermoplastic polymer used in the thermoplastic vulcanizate is the weight amount of the thermoplastic polymer divided by the total weight of the thermoplastic polymer plus the non-oil extended rubber used in the composition multiplied by one hundred, and wherein the thermoplastic vulcanizate is made using 770 to 2,900 intermeshes-sec$^{-1}$ per L/D at 500 to 850 RPM and a feed rate of 9.54 to 16.22 Kg/(Hr×cm$^2$ free cross sectional area) and 75% to 100% of the curatives needed to mix such a composition in a twin screw extruder. Thermoplastic vulcanizates made using this process can have weight gain from oil absorption from 6 to 200% the total composition weight.

DETAILED DESCRIPTION OF THE PREFERRED EMBODIMENTS

Figure 1:
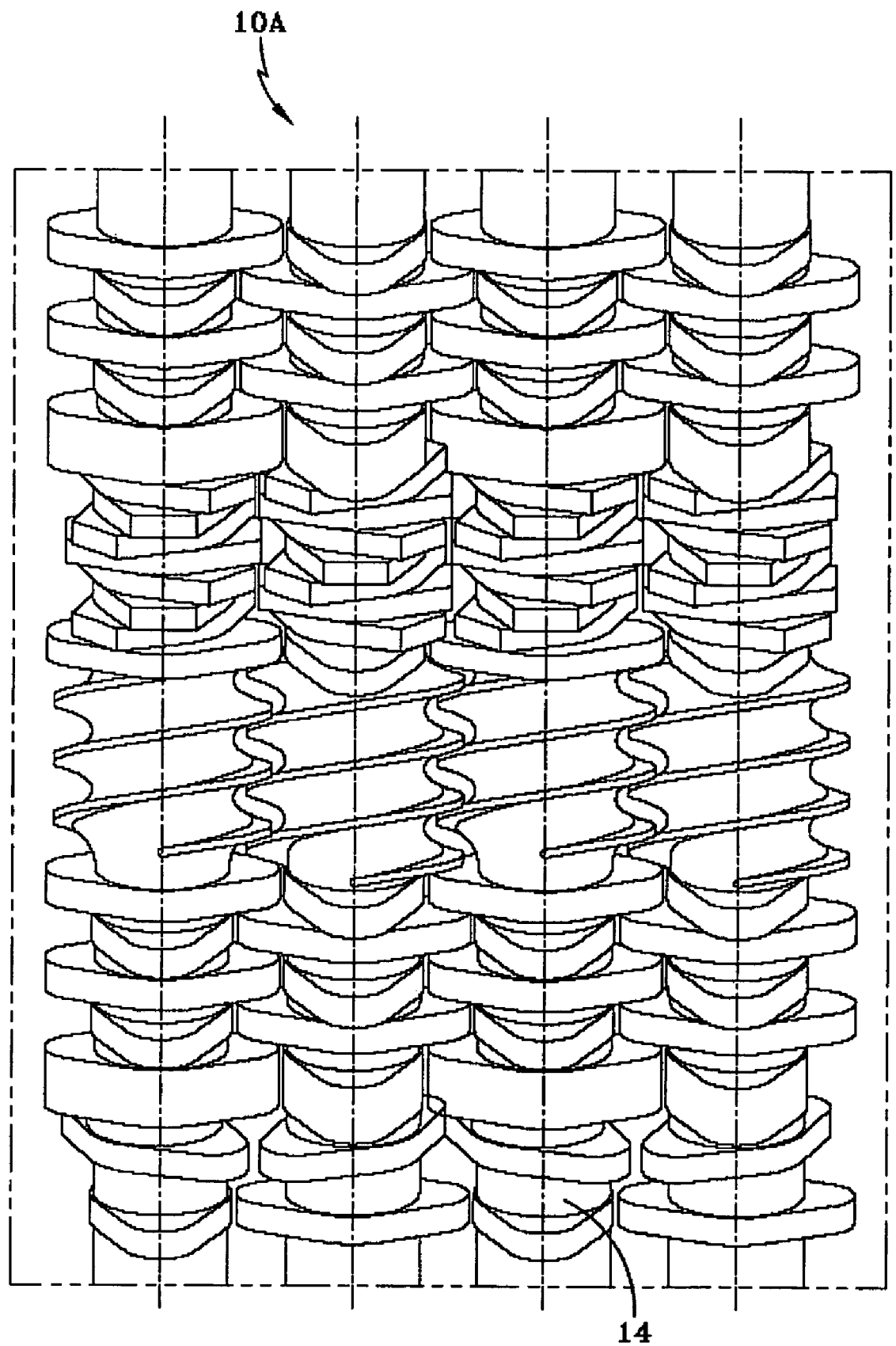
FIG. 1 illustrates intermeshing screws in a ring extruder.
Figure 2:
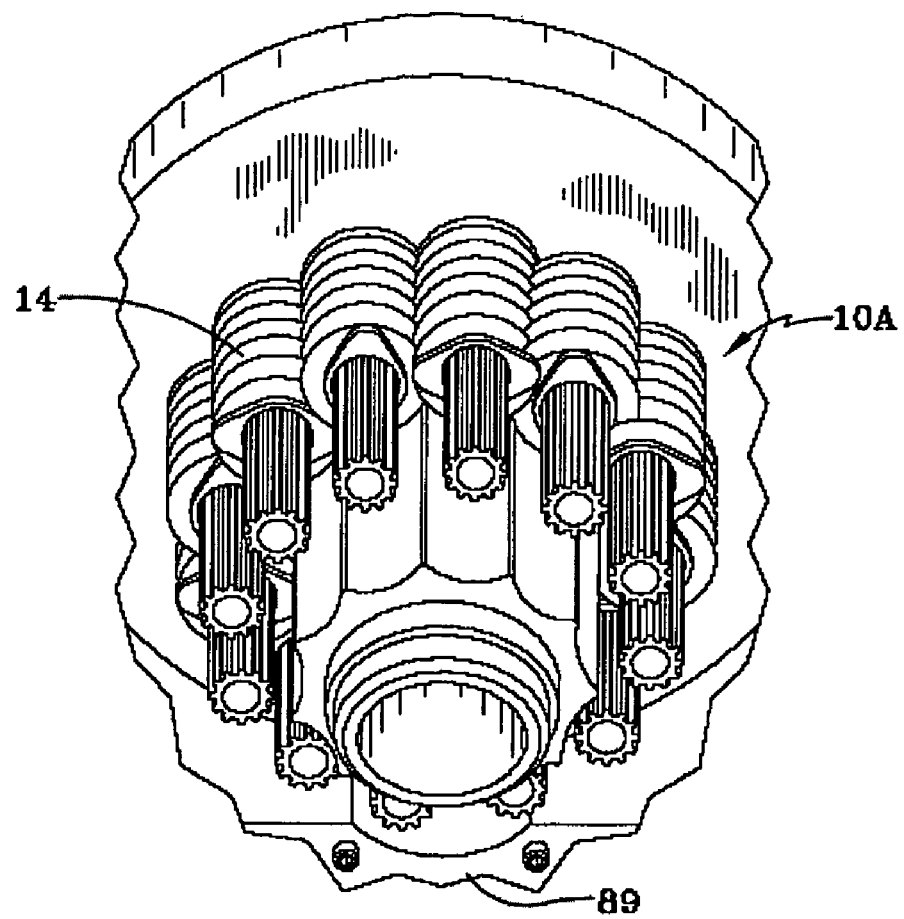
FIG. 2 illustrates the extrusion end of the ring extruder.

The dynamic processing of thermoplastic elastomer blends has been well characterized in the art, and any of the known thermoplastic engineering resins, vulcanizable rubbers, curing agents, accelerators, fillers and reinforcing materials (e.g., carbon black, reinforcing fibers, and glass and synthetic beads), plasticizers, rubber processing oils, extender oils, lubricants, antioxidants, antiblocking agents, antistatic agents, waxes, foaming agents, pigments, flame retardants and other processing aids known in the rubber and plastic compounding arts may be used in the present invention. Examples of such materials are described in U.S. Pat. No. 3,037,954, U.S. Pat. No. 4,311,628, U.S. Pat. No. 4,594,390, U.S. Pat. No. 4,654,402, U.S. Pat. No. 5,397,839, U.S. Pat. No. 5,589,544, U.S. Pat. No. 5,656,693, U.S. Pat. No. 5,672, 660, U.S. Pat. No. 5,783,631, U.S. Pat. No. 5,910,543 and U.S. Pat. No. 6,207,752; these documents are incorporated by reference, or referred to herein for their description of suitable thermoplastics, rubbers, curing agents, additives, oils, fillers, and the like.

It is noted for those in the art, that the mixing process of the invention can be used initially without curatives to produce an intimate, well-dispersed blend of thermoplastic polymer with cross-linkable elastomer, plus such other known ingredients suitable for thermoplastic vulcanizate compositions, see the patents above. This blend can be subsequently cross-linked in further processing, such as in a second pass in the same or in other melt processing equipment upon combination with suitable curatives.

The thermoplastic polymers used in the invention are solid plastic resin materials. Preferably, the resin is a crystalline or a semi-crystalline polymer resin, and of such, more preferably is a resin that has a crystallinity of at least 10 percent as measured by differential scanning calorimetry. Polymers with a high glass transition temperature, e.g., non-crystalline glassy engineering plastics, are also acceptable as the thermoplastic resin. The melt temperature of these resins should generally be lower than the decomposition temperature of the rubber. Thus both polar and non-polar engineering resins can be utilized in the current invention. See the descriptions in the above listed patents. As used herein, reference to a thermoplastic polymer or thermoplastic resin or engineering resin includes a mixture of two or more different thermoplastic resins or a blend of one or more compatibilizers and two or more thermoplastic resins.

Thermoplastic polyolefin resins preferably have a weight average molecular weight ($M_w$) from about 50,000 to about 600,000, and a number average molecular weight ($M_n$) from about 50,000 to about 200,000. More preferably, these resins have a $M_w$ from about 150,000 to about 500,000, and an $M_n$ from about 65,000 to about 150,000. The molecular weight can typically be determined by gel permeation chromatography (GPC) using a suitable standard for the thermoplastic being measured. Additionally, $M_n$ can be measured using Differential Rectractive Index (DRI) and $M_w$ can be measured using Low Angle Laser Light Scattering (LALLS). ASTM D 6474 provides a general description for polyolefins, see also ISO 11344 and T. Sun, Macromolecules, Vol. 34, page 6812 (2001) for adaptation for synthetic rubber.

Exemplary thermoplastic engineering resins include crystallizable polyolefins, polyimides, polyamides (nylons), polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, and polyurethanes. See the patent literature referred to above. The preferred thermoplastic resins are the crystallizable polyolefins that are formed by polymerizing alpha-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. For example, known polyethylene homo- and copolymers having ethylene crystallinity are suitable. Isotactic polypropylene and crystallizable copolymers of propylene and ethylene or other $C_4$-$C_{10}$ alpha-olefins, or diolefins, having isotactic propylene crystallinity are preferred. Copolymers of ethylene and propylene or ethylene or propylene with another alpha-olefin such as 1-butene, 1-hexene, 1-octene, 2-methyl-1-propene, 3-methyl-1-pentene, 4-methyl-1-pentene, 5-methyl-1-hexene or mixtures thereof are also suitable. These will include reactor polypropylene copolymers and impact polypropylene copolymers, whether block, random or of mixed polymer synthesis. These homopolymers and copolymers may be synthesized by using any polymerization technique known in the art such as, but not limited to, the "Phillips catalyzed reactions," conventional Ziegler-Natta type polymerizations, and organometallic, single-site olefin polymerization catalysis exemplified by, but not limited to, metallocene-alumoxane and metallocene-ionic activator catalysis.

Additionally, cyclic olefin copolymers can be used as high melting point thermoplastic polyolefin engineering resins, see for example, U.S. Pat. Nos. 5,324,801 and 5,621,504. Preferred cyclic olefins include cyclobutene, cyclopentene, cyclooctene, norbornene, 5-methyl-norbornene, 3-methyl-norbornene, ethyl-norbornene, phenyl-norbornene, dimethyl-norbornene, diethyl-norbornene, dicyclopentadiene, tetracycloclododecene, methyltetracyclododecene, and the like. Lower carbon number alpha-olefins, e.g., $C_3$-$C_8$, can be used as comonomers, for disruption of cyrstallinity and reduction of melting point. Ethylene is a particularly preferred comonomer in the cyclic olefin copolymers.

The thermoplastic polyolefin engineering resins generally have a melt or softening temperature (Tm) that is from about 40 to about 350° C., the preferable polyolefin resins from about 50 to about 170° C., and even more preferably from about 90 to about 170° C. The glass transition temperature (Tg) of these resins is from about −25 to about 10° C., preferably from about −5 to about 5° C. More generally speaking, including the semi-crystalline and glassy polar engineering resins, useful resins will have a Tg of up to and greater than 100° C., and even greater than 150° C. The characterizing temperatures are can be determined by DSC according to the test method of ASTM D-3418.

An especially preferred commercially available thermoplastic polyolefin resin is highly crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 35 dg/min, and preferably less than or equal to 5.0 dg/min, and more preferably 0.8 dg/min per ASTM D-1238. Melt flow rate is a measure of how easily a polymer flows under standard pressure, and is measured by using ASTM D-1238 at 230° C. and 2.16 kg load.

Elastomers suitable for use in the compositions of the invention are generally compatible with the thermoplastic polymer and have reactive cure sites. Thus thermoplastic polyolefin engineering resins will typically be used with cross-linkable, non-polar olefinic rubbers. The polar engineering resins, or thermoplastics, are combined typically with cross-linkable polar rubbers, or combined polar and non-polar rubbers, often with appropriate compatibilizers, see the patent literature above. The cure sites can either be an integral part of the elastomer backbone or can be incorporated by additional functional groups. As used herein, reference to an elastomer includes a mixture of two or more elastomers.

Unsaturated non-polar rubbers useful to prepare thermoplastic elastomers according to the invention include monoolefin copolymer rubbers comprising non-polar, rubbery copolymers of two or more monoolefins (EPR rubber), preferably copolymerized with at least one polyene, usually a diene (EPDM rubber). EPDM is a polymer of ethylene, propylene and one or more non-conjugated diene(s), and the monomer components may be polymerized using Ziegler-Natta or metallocene catalyzed reactions. Other catalysts systems such as the Brookhardt catalyst system may also be employed. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB); divinyl benzene, and the like, or combinations thereof. Such elastomers have the ability to produce thermoplastic vulcanizates with a cure state generally in excess of about 95 percent (e.g., less than 5 wt. % rubber being extractable in suitable solvent) while maintaining physical properties attributable to the crystalline or semi-crystalline polymer.

The preferred diene monomers are 5-ethylidene-2-norbornene and 5-vinyl-2-norbornene. In the event that the copolymer is prepared from ethylene, alpha-olefin, and diene monomers, the copolymer may be referred to as a terpolymer or even a tetrapolymer in the event that multiple olefins or dienes are used.

The elastomeric copolymers contain from about 20 to about 90 mole percent ethylene units derived from ethylene monomer. Preferably, these copolymers contain from about 40 to about 85 mole percent, and even more preferably from about 50 to about 80 mole percent ethylene units. Furthermore, where the copolymers contain diene units, the diene units can be present in an amount from about 0.1 to about 5 mole percent, preferably from about 0.2 to about 4 mole percent, and even more preferably from about 1 to about 2.5 mole percent. The balance of the copolymer will generally be made up of units derived from alpha-olefin monomers. Accordingly, the copolymer may contain from about 10 to about 80 mole percent, preferably from about 15 to about 50 mole percent, and more preferably from about 20 to about 40 mole percent alpha-olefin units derived from alpha-olefin monomers. The foregoing mole percentages are based upon the total moles of the polymer.

Butyl rubbers are also useful in the thermoplastic elastomer compositions. As used in the specification and claims, the term butyl rubber includes copolymers of an isoolefin and a conjugated diolefin, terpolymers of an isoolefin with or without a conjugated diolefin, divinyl aromatic monomers and the halogenated derivatives of such copolymers and terpolymers. The halogenated versions thereof are particularly useful, especially brominated butyl rubber. Another suitable copolymer within the scope of the olefin rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from 0.1 to 10 weight percent. A preferred example is the brominated copolymer of isobutylene and para-methylstyrene. These copolymers are more fully described in U.S. Pat. No. 5,162,445, the disclosure of which is incorporated herein by reference.

The elastomeric copolymers preferably have a weight average molecular weight that is greater than about 200,000, more preferably from about 300,000 to greater than about 1,000,000, even more preferably from about 400,000 to greater than about 700,000. These copolymers preferably have a number average molecular weight that is greater than about 70,000, more preferably from about 100,000 to about 350,000, even more preferably from about 120,000 to about 300,000, and still more preferably from about 130,000 to about 250,000. Elastomers, especially those in the high end of the molecular weight range, are often oil extended in the manufacturing process and can be directly processed as such in accordance with the invention process.

Useful elastomeric copolymers preferably have a Mooney Viscosity ($M_L(1+4@125°$ C.)) of from about 20 to about 450, more preferably from about 50 to about 400, and even more preferably from about 200 to about 400, where the Mooney Viscosity is that of the non-oil extended polymer. In one embodiment, the elastomeric copolymers will have a negligible melt flow rate (MFR) as determined in accordance with ASTM D-1238 at 230° C. at a load of 2.16 kg, more specifically preferably has an MFR of less than 0.1 g/10 min., more preferably less than 0.05 g/10 min.

The vulcanizable elastomer can also be natural rubbers or synthetic homo- or copolymers of at least one conjugated diene with an aromatic monomer, such as styrene, or a polar monomer such as acrylonitrile or alkyl-substituted acrylonitrile monomer(s) having from 3 to 8 carbon atoms. Those rubbers are higher in unsaturation than EPDM rubber or butyl rubber. Those rubbers can optionally be partially hydrogenated to increase thermal and oxidative stability. Desirably those rubbers have at least 50 weight percent repeat units from at least one conjugated diene monomer having from 4 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

The synthetic rubber can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Nonpolar rubbers are preferred; polar rubbers may be used but may require the use of one or more compatibilizers, as is well known to those skilled in the art.

In the reactive processing of thermoplastic vulcanizates, the thermoplastic component(s) is added, or fed, to the melt processing equipment typically in pellet form while the crosslinkable rubber is added in crumb, particles from pulverization, or pellet (often dusted with a filler or semi-crystalline polymer powder) to enhance physical mixing in the feed throat. Alternatively, both thermoplastic and rubber may be fed directly in molten form together, or independently.

Curatives, or curing agents (curative plus coagent(s)) that may be used in the invention for cross-linking, or vulcanizing, the elastomers can be any of those known to those skilled in the art for processing vulcanizable rubber, or more particularly, thermoplastic vulcanizates, including silicon hydrides, phenolic resins, peroxides, free radical initiators, sulfur, zinc metal compounds and the like. The named curatives are frequently used with one or more coagents that serve as initiators, catalysts, etc. for purposes of improving the overall cure state of the rubber. The curatives may be added in one or more locations, including the feed hopper of a melt mixing extruder. For more information see, S. Abdou-Sabet, R. C. Puydak, and C. P. Rader, "Dynamically Vulcanized Thermoplastic Elastomers", *Rubber Chemistry and Technology*, V. 69, No. 3, July-August 1996, and references cited therein. The curative systems of U.S. patents U.S. Pat. Nos. 5,656, 693, 6,147,160, 6,207,752, 6,251,998 and 6,291,587 are suitable, and are incorporated by reference.

Examples of organic peroxides that may be used are di-tert-butyl peroxide, dicumyl peroxide, t-butylcumyl peroxide, alpha-alpha-bis(tert-butylperoxy)diisopropyl benzene, 2,5 dimethyl 2,5-di(t-butylperoxy)hexane, 1,1-di(t-butylperoxy)-3,3,5-trimethyl cyclohexane, n-butyl-4,4-bis(tert-butylperoxy)valerate, benzoyl peroxide, lauroyl peroxide, dilauroyl peroxide, 2,5-dimethyl-2,5-di(tert-butylperoxy) hexene-3, and in general, diaryl peroxides, ketone peroxides, peroxydicarbonates, peroxyesters, dialkyl peroxides, hydroperoxides, peroxyketals and combinations thereof. Azo initiators such as Luazo® AP (available from ATO Chemical) may also be used as free radical initiators.

In addition to the peroxide, other cure adjuvants or coagents can be used. Examples are triallyl cyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, polyfunctional methacrylates, acrylate and methacrylate metal salts, and oximer, e.g. quinone dioxime.

Hydrosilylation has also been disclosed as a crosslinking method for thermoplastic vulcanizates and is suitable in the process of the invention. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethyl-siloxane copolymers, alkyl methyl polysiloxanes, bis(dimethylsilyl)alkanes and bis(dimethylsilyl)benzene. See, U.S. Pat. Nos. 5,672,660, and 6,150,464, for further description, both are incorporated by reference.

Platinum-containing catalysts which are useful with the silicon hydride compounds for improved cure in the process of the invention are described, for example, in U.S. Pat. No. 4,578,497; U.S. Pat. No. 3,220,972; and U.S. Pat. No. 2,823,218, all of which are incorporated herein by reference. These catalysts include chloroplatinic acid, chloroplatinic acid hexahydrate, complexes of chloroplatinic acid with sym-divinyltetramethyldisiloxane, dichloro-bis(triphenylphosphine)platinum (II), cis-dichloro-bis(acetonitrile)platinum (II), dicarbonyldichloroplatinum (II), platinum chloride and platinum oxide. Zero valent platinum metal complexes such as Karstedt's catalyst are particularly preferred, as described in U.S. Pat. No. 3,775,452; U.S. Pat. No. 3,814,730; and U.S. Pat. No. 4,288,345 all of which are incorporated herein by reference.

Any phenolic curative which fully cures EPDM rubber is suitable in the practice of the invention. The use of conventional phenolic resin curatives for crosslinking EPDM in a thermoplastic elastomer is disclosed in U.S. Pat. No. 4,311,628, which is incorporated by reference for its teachings thereon. See also, the dibenzyl ether modified phenolic resins of U.S. Pat. No. 4,952,425, also incorporated by reference for its teachings. For further details of phenolic curative systems see "Vulcanization and Vulcanizing Agents," W. Hoffman, Palmerton Publishing Company. Suitable phenolic curing resins and brominated phenolic curing resins are commercially available under the trade names SP-1045, HRJ14247A, CRJ-352, SP-1055 and SP-1056 from Schenectady Chemicals, Inc. Similar functionally equivalent phenolic curing resins may be obtained from other suppliers. In one embodiment, the phenolic curative is added into the first feeding throat along with any coagent, polymer feed components, and optionally, with all, or a portion, of filler, processing oil and the like. In another embodiment, the coagents are added at the feed throat and the phenolic resin is added downstream from the feed throat but preferably not after 46% of the length of the multi-screw extruder.

The rubber may be partially of fully cured or crosslinked using such curatives. In one embodiment, the rubber is advantageously completely or fully cured. The degree of cure can be measured by determining the amount of rubber that is extractable from the thermoplastic vulcanizate by using cyclohexane or boiling xylene solvents as an extractant. This method is disclosed in U.S. Pat. No. 4,311,628, which is incorporated herein by reference for purpose of U.S. patent practice. Partially cured rubber will have as much as 50 wt. % extractable in solvent, and generally more than about 15 wt. % extractable. In preferred embodiments, the rubber has a degree of cure where not more than 15 weight percent, in other embodiments not more than 10 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice.

Often the engineering resin and vulcanizable elastomer or vulcanized elastomer alloys of the composition may be combined with a compatibilizer for these components. The compatibilizer provides interfacial adhesion between the vulcanized elastomer and the engineering resin. In conventional processing, without the compatibilizer, blends of engineering resin and vulcanized elastomer may often have poor mechanical elongation properties, the weak interfaces between the components may fail, and the components may delaminate. Compatibilizers include block copolymers having one block that is compatible with one component and at least one other block that is compatible with at least one other of the principal components. Other examples would include functionalized polymers having a backbone polymer that is compatible with one of the principal components and a graft moiety that is either compatible or reactive with at least one of the other principal components.

Compatibilizer forming materials may also be used. The compatibilizer can be formed by the direct interaction of segments containing the functional groups present in the major components, i.e. the engineering resin and the vulcanizable or vulcanized elastomer, or by interaction with another bi- or multi-functional compound. Such compatibilizers are known in the art, e.g. in U.S. Pat. No. 4,455,545 and Journal of Macro Molecular Science Chemistry, A26(8), 1211 (1989). Where the engineering resin is a polyamide, the preferred compatibilizer includes the reaction product of nylon and functionalized polypropylene which is prepared by melt mixing nylon (6) with polypropylene grafted with 0.1-2.0 weight percent maleic anhydride in the ratio of nylon:maleated polypropylene ranging from 95:5 to 50:50. See Appl. Polym. Sci., 18, 963 (1974) and Eur. Polym. J., 26, 131 (1990). For example, a maleated olefin may be selected for its compatibility with an olefinic vulcanizable or vulcanized elastomer and reactivity with the polyamide engineering resin. Other compatibilizer forming materials such as an epoxy group grafted to a polypropylene molecule or an oxazoline group grafted to an olefin would also be appropriate to form a compatibilizer for a polyamide and olefinic vulcanizate blend. For purposes of this invention, a compatibilizer forming material is defined as a functionalized olefin or graft and/or block copolymer which acts to form a compatibilizer when grafted to an engineering resin.

The compatibilizer will typically be present in a compatibilizing amount, e.g., from 2-20 wt. %, based upon the total weight of the composition, preferably 5-15 wt. %, and more preferably 5-10 wt. %.

Fillers can be inorganic fillers, such as calcium carbonate, clays, silica, talc, titanium dioxide, or organic carbon black, reinforcing fibers or microspheres, and any combinations thereof. Any type of carbon black can be used, such as channel blacks, furnace blacks, thermal blacks, acetylene blacks, lamp blacks, combinations thereof and the like.

The additives can be added during the preparation of the vulcanizate, before, during or after vulcanization of the rubber, or during the preparation of the finished composition, or some portions thereof in both, provided that the total amount of the additives does not exceed about 75 weight percent, based on the total thermoplastic elastomer composition, including the additives. Additionally, the TPV as prepared, may be finished by pelletization in accordance with known methods for plastic pelletization. Such pellets advantageously can serve as rubber particle-containing intermediate (or TPV concentrate) having a minimum of the original thermoplastic (e.g., 2.4 wt. % to less than 18.6 wt. %, or even less than 6.7 wt. %, thermoplastic polymer based upon the total of thermoplastic and non-oil extended rubber) such that additional thermoplastic, whether the same, similar or completely different, can be added in subsequent melt blending steps. Any of the other additives or modifiers can be similarly added in this manner.

Adverse interactions between the curing agents and such additive materials can be thus be avoided. For instance, the known scission of polypropylene polymers, or cross-linking of polyethylene, in the presence of peroxide curing agents, can be avoided since the curing reaction can be generally conducted so as to at least nearly exhaust the reactive curing agents. Accordingly, the invention also includes a process for preparing an additive modified thermoplastic elastomer composition comprising a) introducing in pellet form a thermoplastic vulcanizate according to the description above into a melt blending process; b) adding a modifying amount of any one or more of additives selected from additional thermoplastic polymers, thermoplastic polymeric modifiers, solid particulate fillers, extender or process oils, and colorants.

Extender and process oils are particularly useful as plasticizers in the reactive processing of the invention. Rubber extender and process oils have particular ASTM designations depending on whether they fall in a class of paraffinic, naphthenic, or aromatic process oils derived from petroleum fractions. The type of process oils utilized will be customarily used in conjunction with the rubber component. The ordinary skilled person will recognize which type of oil should be utilized for a particular rubber. The quantity of rubber process oil utilized is based on the total rubber content and can be defined as the ratio by weight of the process oil to the total rubber in the thermoplastic vulcanizate. This ratio can vary from about 0 to about 4.0:1, preferably from about 0.2:1 to about 3.0:1, more preferably from about 0.3:1 to about 2.0:1. A portion of the process oil is often included in the rubber as acquired (oil-extended rubber). Larger amounts of process oil can be used, the effect being generally reduced physical strength of the composition. Oils other than petroleum-based oils, such as oils derived from coal tar and pine tar can also be utilized. In addition to petroleum-derived rubber process oils, oligomeric and low molecular weight polymer oils from unsaturated monomers, e.g., poly-alpha-olefins, separated from petroleum fractions, organic esters and other known synthetic plasticizers can be used. Plasticizers suitable for these compositions are covered in U.S. Pat. No. 5,290,886, and U.S. Pat. No. 5,397,832 incorporated herein by reference. For temperature, viscosity control and improved mixing, the process oil is added at more than 1 location along screw axis, such as 2-5 locations, preferably 2-4 locations. The addition of oil can be before, during, or after cure. In thermoplastic vulcanizates, process oil in the rate ratio of oil to thermoplastic polymer of 160:1 to 1:20 may be used.

With reference now to FIGS. 1, 3, 4 and 5, in the prior art Ring Extruder used to illustrate the invention, screws (14) are intermeshing and co-rotating. The twelve screws (1-12) in the 3+Extruder GmbH ring extruder are arranged in fixed positions in a circle, like the face of a clock, and are geared to the same motor, and rotate at the same speed. The specifications of the ring extruder are described in WO 2004/009327 A1, and said publication is incorporated herein in its entirety by reference.

In the illustrated embodiment, the ring extruder (10A) has a modular design and is composed of barrel segments or barrels (21-34) which can be solid (even numbered barrels) or combination barrels (odd numbered barrels). The combination barrels contain ports (43, 45, 47, 49, 49A, 51, 51A, 53 and 53A) in the top, bottom and sides, which can be used for injecting additional ingredients, or for venting volatile gases from the extrudate.

Those skilled in the art will recognize that the extruder can be configured using different barrel lengths, and different arrangements of solid barrels and combination barrels, depending on processing requirements. Also, ports may be included wherever they are deemed useful. Those skilled in the art will also recognize that the gearing can be changed to alter the rotation of one or more of the screws with appropriate screw designs.

Although the concepts of the present invention have been illustrated using twelve intermeshing screws, modifications using at least three intermeshing screws are covered by the present invention. For example, with reference to FIG. 4, the ring extruder may be divided into two portions by non-intermeshing blocking screws at the 12 and 6 screw positions, and two different mixing processes can be carried out in the extruder at the same time. The blocking screws can be designed to prevent the cross-over of material from one portion of the extruder to another, and may be static, or they can be solid and rotating. The present invention can also be utilized using the corotating compounders with four screws, supplied by Technovel Corp. of Osaka and Coperion Corp., Ramsey, N.J.

To illustrate, when blocking screws are used at the 12 and 6 positions, rubber curatives and initiators can be mixed with a thermoplastic polymer and optionally other ingredients, such as fillers, in one portion of the apparatus, and a cross-linkable elastomer, and optionally plasticizers and other non-cross-linking ingredients known in the rubber processing industry, can be mixed in another portion of the apparatus, and the two extrudates can be cooled to a temperature below the activation temperature of the curatives and initiators and dumped into another mixer, preferably a twin screw extruder or another ring extruder, and mixing can be continued to ensure complete mixing of all ingredients before cross-linking begins. If the temperature can be maintained at or above the melting temperature of the ingredients, the extrusion can be made part of a continuous process.

In a continuous process, the materials may be mixed and melted in a twin screw extruder and passed into a ring extruder for further processing or dynamic curing, or mixed and melted in a ring extruder and passed to another extruder as a melt or as a pellet, for further processing or dynamic curing, or mixing of curing agents and/or dynamic curing may be carried in one or more compounders where at least one of the compounders used is an extruder with three or more screw intermeshes. Other arrangements and processing equipment known to those skilled in the art may be used according to processing requirements. The processing may be computer controlled as described in U.S. Pat. No. 5,158,725, and said patent is incorporated herein by reference.

Although similar intermeshing screws were used in the illustrated embodiments, those skilled in the art will recognize that the screws may have the same or different profiles, and in another embodiment, the screws may be configured to be blocking at locations (6) and (12), or at locations (4), (8), and (12) in a first portion of the extruder, optionally the first ¼ of the L/D of the extruder, and configured to be intermeshing in another portion of the extruder, to provide premixing of curative with thermoplastic polymer, and further mixing of the thermoplastic polymer and curatives with a cross-linkable rubber during the same extrusion. As used herein, the first ¼ of the extruder is defined as the ¼ portion of the mixing length of the extruder nearest the feed throat (18) of the extruder.

With reference again to FIGS. 3 and 4, the cross section of mixing barrel (16), core (15) and screws (14) shows the relationship of the screws (14) to mixing chambers (17), which contain screws (14). The screws (14) may be configured to force mixing at core (15), or at barrel (16), or both. Venting, when it is used, takes place through barrel (16).

Figure 5:
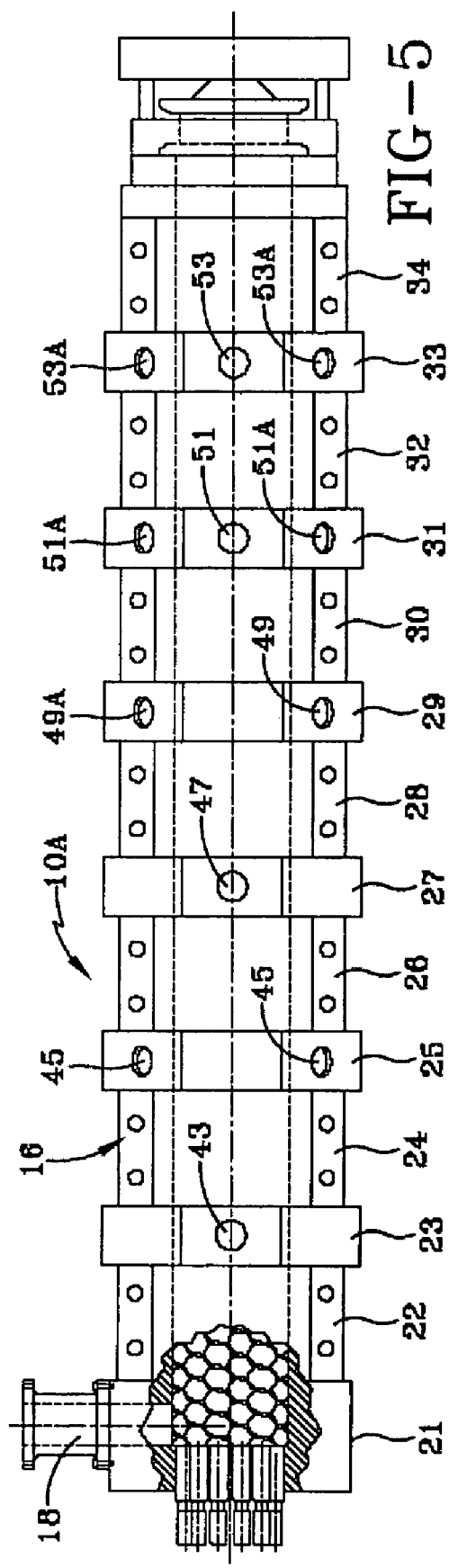
FIG. 5 illustrates a side view of a barrel for a ring extruder.

FIG. 5 shows a side view of mixing barrel (16), and illustrates feed throat (18), wherein bulk thermoplastic polymers and vulcanizable rubbers may be introduced in pellets or granular form. If desired, especially in reactions where multiple extruders are used, the thermoplastic polymer may be added in melt form. In the illustration, mixing barrel (16) comprises fourteen barrel sections (21, 22, 23, 24, 25, 26, 27, 28, 29, 30, 31, 32, 33 and 34), wherein, except for feed barrel (21), the odd numbered sections comprise combination barrels which include ports (43, 45, 47, 49, 49A, 51, 51A, 53 and 53A) which can be used to inject additional ingredients, or to vent volatile gases from the extruding material.

Figure 6:
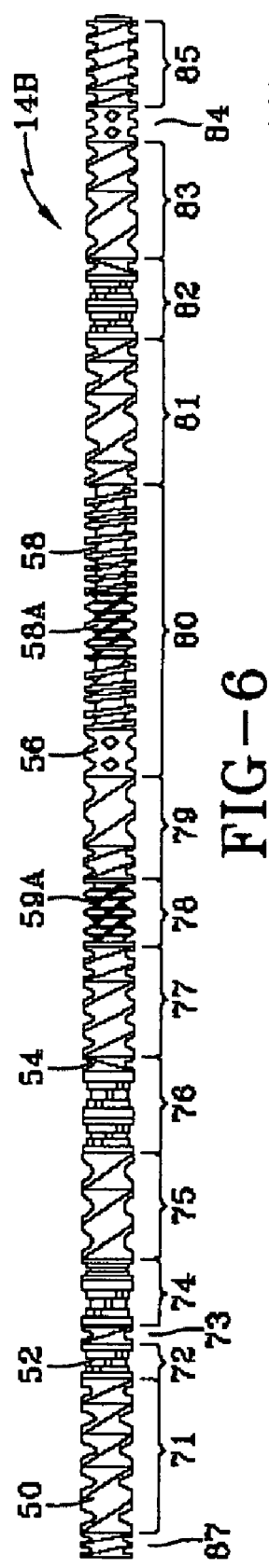
FIG. 6 illustrates a screw configuration, showing mixing elements, used in the present invention.
Figure 7:
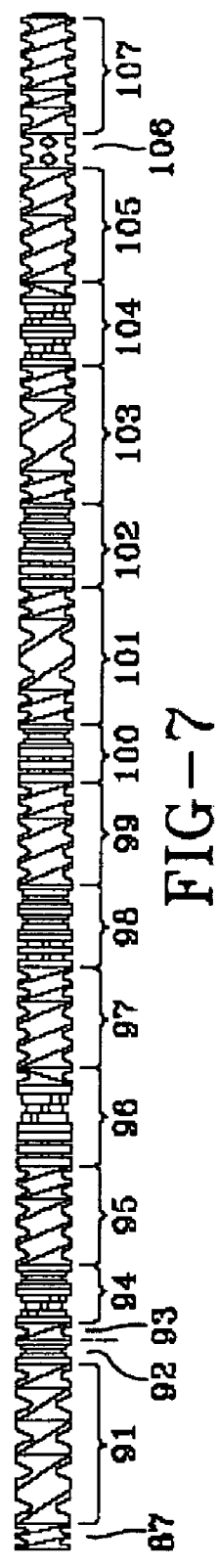
FIG. 7 illustrates a second screw configuration used to illustrate the invention.

With reference now to FIGS. 6 and 7, screws (14B and 14A), which can be used for dynamic cross-linking, comprise mixing elements designed, together with the RPM used, the feed rate of the materials, and the physical properties of the materials, to provide shear and mixing that produces a temperature profile and residence times suitable for cross-linking.

Figure 8:
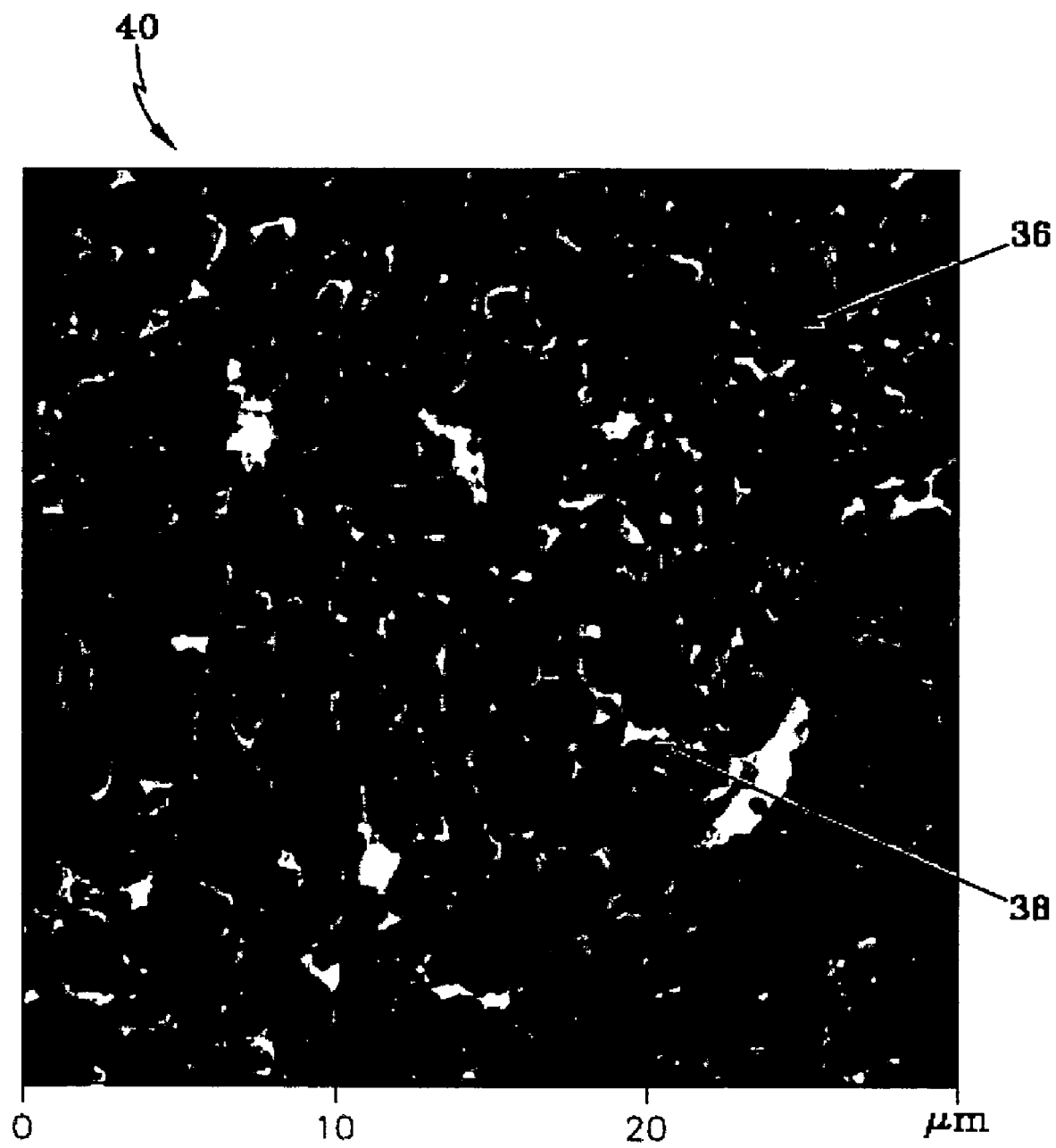
FIG. 8 illustrates an Atomic Force Microscopy (AFM) image of a thermoplastic vulcanizate of the invention.

With reference now to FIG. 8, an atomic force microscope image of a thermoplastic vulcanizate of the invention is shown. The thermoplastic vulcanizate (40) shows a good distribution of small rubber particles (36) in a continuous phase thermoplastic polymer (38). Although rubber particles (36) are thermoset and are fully cross linked, their dispersion in thermoplastic polymer (38) makes it possible for thermoplastic vulcanizate (40) to be reheated and shaped for final production, elimination of scrim, and eventual recycling, without loss of mechanical properties.

In the processing of thermoplastic elastomer blends, especially those blends containing a majority of elastomer, in the early stages of mixing, as the two ingredients are melted together, the lower temperature-melting elastomer comprises a continuous phase of a dispersion containing the thermoplastic polymer. As the cross-linking of the elastomer takes place, the cured elastomer is gradually immersed into the molten thermoplastic polymer and eventually becomes a discontinuous phase, dispersed in a continuous phase of thermoplastic polymer. This process is referred to as phase inversion, and if the phase inversion does not take place, the thermoplastic polymer may be trapped in the cross-linked rubber network of the extruded vulcanizate such that the extrudate created will be unusable for fabricating a thermoplastic product.

In the prior art, for most applications, the practical lower limit of thermoplastic polymer required for phase inversion to take place was considered to be greater than about 18.6% by weight of the total weight of the thermoplastic polymer and elastomer. Softer materials can be produced by using softer thermoplastic polymers, such as syndiotactic polypropylene or lower melting semi-crystalline polypropylene or polyethylene copolymers. The thermoplastic vulcanizates produced using these materials, however, have lower Tm or Tg, sometimes well below 135° C. reducing service temperature tolerance for certain uses (e.g., underhood automobile applications), and may be tacky so as to interfere with or render difficult packaging and handling, and may bleed oil, thereby limiting their application in products.

In accordance with the present invention, it has been found that it is possible, by reducing the amount of thermoplastic polymer used in the thermoplastic vulcanizate composition, to produce very soft materials using high modulus or highly crystalline thermoplastic polymers, wherein high service temperature use is not compromised, and a clean (non-bleeding), non-tacky extrudate product, even after pelletization, is provided. The very soft composition can contain process oil relative to thermoplastic in the rate ratio of 160:1 to 7:1 and more preferably 113:1 to 13:1.

This discovery has also leads to the development of more versatile and easy to use masterbatches of thermoplastic vulcanizates. Whereas it is the current practice to make masterbatches using polypropylene as the thermoplastic polymer, because of its low temperature melting point and facility for extrusion, large amounts of compatiblizers are needed when it is desired to mix the masterbatch with a polar engineering resin, such as, polyamide or polyester thermoplastic polymers, when making high modulus and high melting temperature products. In such products, the presence of polypropylene may diminish sought properties, such that the reduced use of polypropylene made possible by the invention processing permits the production of improved polar-resin based final products. Similarly, reducing the amount of thermoplastic can also reduce the need for modifying amounts of polymeric compatibilizers for the thermoplastic phase. Thus where flexible polyolefins, styrene block copolymers, grafted random or block copolymers, etc., and other compatiblizers or property modifiers, often more expensive than the base thermoplastic, have been needed to modify the effects of that base thermoplastic, lesser amounts will needed when using the invention process.

In additional embodiments of the invention, additional thermoplastic polymer may be added to the polymer melt after addition of the curatives, in the same or a different extruder. In such an embodiment, the additional thermoplastic polymer may be added for its compatibilizing ability, or may be the same as the initial thermoplastic, e.g., polypropylene, or it may be added for its engineering properties, for example, polar thermoplastics such as polyamide or polyester. Thus in some embodiments, the thermoplastic polymer comprises one or a plurality of different thermoplastic materials, and further comprises the step of adding such thermoplastic polymers at various locations in the extruder during the extrusion. The added thermoplastic polymer may be added in pellet or molten form, or such other form as may be useful under the conditions employed, and may be added to downstream ports using pellet crammers or melt feeding extruders. Properties of a vulcanizate can be modified by adding a portion of the thermoplastic polymer at the feed throat and one or more portions are added in at least one additional location on the extruder after the addition of curative. In another embodiment, an additional portion of thermoplastic polymer is added in at least one location on the extruder before addition of curative. Using such approaches can affect the energy of processing, can reduce the temperature and thus improve control of the curing zone, can improve the reaction kinetics an efficiency of the curing reaction, and otherwise make the processing more efficient.

With reference again to FIG. 6, in the illustrated embodiment, the screw (14B) comprises thirty seven screw elements that represent nineteen different kinds of elements. The nineteen different kinds of elements can be classified as conveying elements (50), kneaders (52), back flow elements (54), flow splitters (56), and restrictive conveying elements (58, 58A). The conveying elements (50) are fluted screws of various pitches that are designed to move the extrudate forward in the barrel. The kneaders (52) tend to restrict the flow of the extrudate, and the kneaders provide extreme shearing, particle size reduction and heat generation. The back flow elements (54) are fluted to reverse the flow of the extrudate, and act as restricting or blocking elements. The restrictive conveying elements (58, 58A), can be single flight elements with wide crest (58) or those (58A) with slotted flighting which kneads the extrudate as it is conveyed forward. The restrictive conveying elements comprise two different types, i.e. those having low pitched flights (58), and those having a high pitched flight with slots (58A). The functions of similar screw elements are described in a publication from Coperion Corporation known as 'Processing lines', vol. 9, No. 1, January 1999.

The screw elements are described commercially in their design by letter and number designations. The number and letter designations and the screw elements are available from Century Extruders, Traverse City, Mich.

S and SK refer to conveying elements (50) which do some mixing, but are used mainly to push material in the extruder from the feed hopper end to the extruding end. The SK elements are conveying elements with a higher free volume than regular conveying elements, and are used as transition elements between flow zones. SG refers to elements (58) that convey the extruding material while providing substantial mixing.

KB refers to kneading elements (52). The kneaders do not have a large bias toward moving the extruding material forward, and tend toward filling with material from upstream in the extruder. The kneaders may comprise any number of plates that may have one or more points. For example, a two point kneading plate has a generally parallelogram shape with two points corresponding to the maximum diameter of the plate, and a three point plate has three similar maximum diameter points and three corresponding flat areas with a diameter close to the diameter of the screw shaft. When a back flow conveyer is used in conjunction with a kneader, filling of the flow zone around the kneader is assured, and the increased pressure and shearing caused by the filling has a tendency to dramatically increase the temperature of the extruding material.

Numbers in the screw element designations refer to the pitch of the flutes, the length of the element and the number of plates in the element. Additional letters refer to their orientation left (L) or right (R) and their type. In the description, the letter 'N' denotes that the elements are 'neutral', and provide no conveying action in either direction.

S060R030, for example, refers to a conveying element (S), having a flute pitch of 060 mm to the right (R), and having a length of 30 mm. Similarly, KBS405R030 refers to a kneader (KBS) having a separation of 45° between adjacent plate tips, five plates with a right hand conveying bias, and a length of 30 mm. S040RL040 Igel and KBS905N030 are flow splitting elements that cut the extruding flow into two or more streams, and directs the divided streams left (L) and right (R) back upon themselves. These flow splitting elements cause a crossover between the inner and outer extrudate streams. S030L015 refers to a back flow conveying element having a pitch of 30 mm to the left (L), and a length of 15 mm. The L designation describes the pitch direction of the fluting as tending to push the extruding material back toward the feed throat (18), sometimes referred to as reverse flow.

The back flow elements, the kneaders and other non-conveying or low conveying elements, cause a build up of pressure in their particular flow zones, until the pressure of feeding material and the pressure caused by the upstream conveying elements overcomes the back pressure, and forces the extruding material through the respective flow zone.

In the illustrated embodiments, back flow elements, when they are used, are always at the end of a flow or mixing zone. Since the back flow elements create a dam, it is deemed that they define the end of a flow zone. Similarly, since a restrictive conveying element produces high pressure in its flow zone, the end of such an element, where the pressure is released into a forward conveying element, is considered to be the end of a flow zone.

Screw (14B), designated screw profile B, was used for making soft (Shore A 12.4 to 35) thermoplastic vulcanizates, although it has shown utility for making thermoplastic vulcanizates having a Shore A hardness of up to 60 and more, largely depending upon the adjusted levels of thermoplastic, rubber and oil. Screw 14A, designated screw profile A, was designed for making intermediate hard thermoplastic vulcanizates (Shore A 35 to 90), although it has shown utility for making thermoplastic vulcanizates with a hardness of Shore D up to 50. Each of the screw profiles A and B has distinct flow zones (71-85) for B and (91-107) for A. Each of the flow zones has a specific function, and the function of each flow zone can be defined by its shear rate, and the number of shears carried out in the flow zone.

The kneaders and flow splitters, for example, are used for melting and increasing the temperature of the extrusion, in addition to the mixing they provide, and are designed to produce a large number of shears. The conveying elements provide some mixing, but are designed mainly to move the extrusion along, and do not produce as many shears as the kneaders. Most of the other mixing elements fall somewhere between the kneaders and the conveying elements in their mixing capability and their shearing capability.

As illustrated in U.S. Pat. No. 4,594,390, shear rate is defined by C×RPM/tip clearance (where the 'tip clearance' is the distance between the tip of the screw and the wall of the extruding chamber), and C is the circumference of the element. In other words, the shear rate is the tip velocity divided by the tip clearance. The number of shears, therefore, is the 'shear rate'×'the length of the particular flow zone', and the shear rate is directly related to the mixing aggressiveness of a particular screw profile. In the practice of the invention process, shear rates of 400 $sec^{-1}$ and greater can be effectively used.

There is substantial shearing between the tips of the screws and the bottom of the grooves of adjacent intermeshing screws, and the prior art calculations do not completely describe the mixing process, and for the purposes of this invention, the mixing ability of a particular screw profile will be described in terms of the 'meshes' of the screw, and the 'intermeshes' of a plurality of intermeshing screws. As used herein, 'meshes' refers to the mixing potential of a particular screw element or profile, and 'intermeshes' refers to the mixing potential of a plurality of intermeshing screws.

The number of shears created by a specific screw element is dependent on the profile of that element, and the number of shears created between the screw tips and the mixing barrel will be an inherent property of the element profile, and the calculation of the meshes and intermeshes of the screws is a more satisfactory method of determining a screw profile's processing ability than the methods described in the prior art.

During processing, when the screws are rotating at a specific RPM, the number of intermeshes/sec, or intermeshes $sec^{-1}$, can be calculated, as a measure of the amount of mixing taking place in the materials. The amount of mixing that goes into the processing of a particular blend of thermoplastic polymers and cross-linkable rubbers further depends on the feed rate of the materials, the RPM of the extruder screws, the viscosity ratio and temperature of the materials, their surface wetting properties, the surface tension of the particles, and their flow characteristics.

Figure 3:
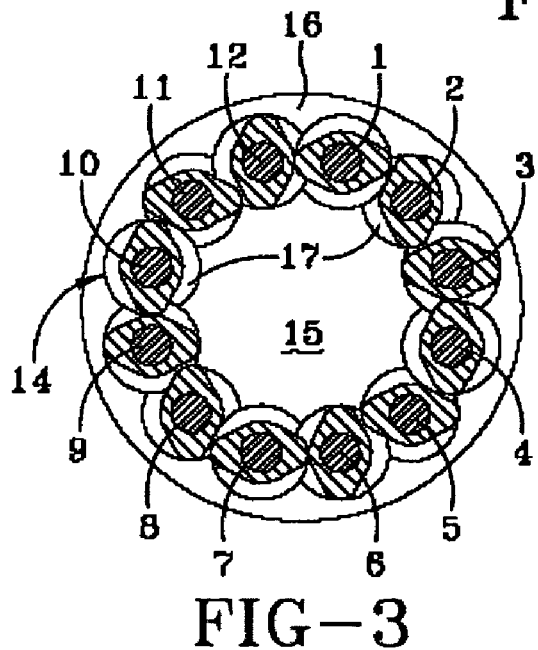
FIG. 3 illustrates a representation of a cross section of the mixing barrel, and contents of a ring extruder.
Figure 4:
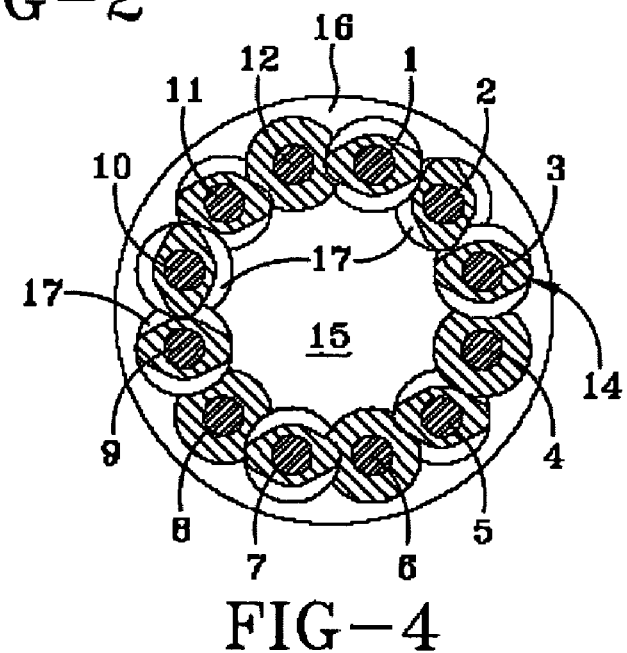
FIG. 4 illustrates a cross section of a ring extruder having blocking screws replacing several mixing screws.

The FCA is the free cross sectional area in $cm^2$ that exists between the screw elements, the barrel surface and the Core (17 in FIGS. 3 and 4). It is furnished by the extruder manufacturer. Material feeding rate into the extruder is specified on the basis of FCA. For example, in a 30 mm ring extruder the FCA as provided by the vendor is 26.2 cm². At 400 RPM and 200 Kg/Hr rate, the material feeding rate=(200 Kg/Hr)/(26.2 cm²)=7.63 Kg/(Hr×cm²) and at 100 RPM and 50 Kg/Hr, the material feeding rate=(50 Kg/Hr)/(26.2 cm²)=1.91 Kg/(Hr×cm²).

The process of the invention can be used on mixers of similar type but different sizes following the general guidelines for scale up described in the publication by P. H. M. Elemans, H. E. H. Meijer, *Mixing and compounding of Polymers*, pages 457-470 (Hanser, N.Y. 1994) and also the publication by C. Rauwendaal, *Polymer Extrusion*, Pages 434-439 (C H Verlag Munich, 1986). In practice, often the rate, screw speed, barrel temperature and other process conditions are optimized to get target product properties at scale-up. For similar quality in scale-up, it is important to maintain similar residence time, melt temperature, cure and mixing profile along screw axis on different size machines.

The rate for scale-up at same screw speed can be calculated by multiplying the material feeding rate for the known extruder with the FCA for the desired or target extruder and the diameter ratio of the target and the known extruder. This is further illustrated for the example where rate for a 50 mm ring extruder is calculated from the data from the 30 mm size equipment at 400 RPM.

Rate$_{50\,mm}$(Kg/Hr)=(material feeding rate (Kg/(Hr×Cm²)))$_{30\,mm}$×FCA$_{50\,mm}$×(50 mm/30 mm)=7.63 Kg/(Hr×Cm²)×74.1 Cm²×1.67=944 Kg/Hr.

The significant parameters that define the mixing imparted by the extruder in the process are related in the following manner: the degree of mixing is a function of the No. of Tips factor, Pitch factor, Length or L/D factor, Restriction factor, Free Cross-Sectional Area (FCA), RPM and Rate.

Independent of the materials used, the meshes per second in a particular flow zone can be found by multiplying the Restriction Factor, times a length factor, times a pitch factor, times a number of tips factor times the number of revolution per second. The number of intermeshes/sec can be found by multiplying the resulting number by the number of screws used in the extrusion. Paras. [0111] and [0112] describe this further and such is illustrated in the Table of Meshes below.

Screw profiles that may be used to duplicate the results in the Examples herein may have 250 to 820 meshes, preferably 300 to 800 meshes, and more preferably 340 to 745 meshes. In the examples, the screws used provided about 477 to 569 meshes or 10.86 to 13.03 meshes per L/D, where meshes per L/D was calculated by dividing the meshes for a given screw design with its L/D.

For the purposes of this invention, a flow zone or a mixing zone can be further defined as a set of one or more mixing elements or a set of one or more conveying elements. End point of each zone is defined by the transition from conveying to mixing elements or vice versa. For example S060R060 followed by S060R030 will be one zone. However S060R060 followed by SE010R030, or any other mixing element, defines a separation between two different zones. Accordingly, if all 0.5 L/D mixing and conveying elements are used, theoretically a screw of 100 L/D can have 200 mixing zones. Those skilled in the art will recognize that larger diameter machines can use screw elements having <0.5 L/D.

With reference again to FIG. 6, screw profile B has 15 flow zones. Flow zone (71), for example, is a conveying zone, and although deep channeled SK conveying elements, and standard S conveying elements having different pitches are used, the purpose of the flow zone is to convey material from feed throat (18) to melting zone (72). Melting zone (72) comprises a five plate kneader. The purpose of flow zone (72) is to provide dispersive and distributive mixing of the ingredients, and to begin the melting of the thermoplastic polymer and the cross-linkable rubber to promote the mixing of progressively smaller particles, and in those processes where dynamic cross-linking is desired, to begin increasing the temperature of the mix to a point where cross-linking can begin.

Flow zone (76) comprises two five plate kneaders and a reverse flow conveying element. The reverse flow conveying element insures that flow zone (76) will be filled with material during extrusion, substantially increasing pressure and shear on the material. Flow zone (78) comprises a special mixing element SG690075R60 that comprises 6 segments having a 69 degree pitch which have cross hatched fluting. Similarly, flow zone (80) comprises a number of similarly restrictive conveying elements.

In an effort to quantify the mixing properties of a particular screw profile, the inventors have assigned Restriction Factors to each of the elements used in a screw profile, based on a mixing factor determined by the number of plates, shears and contact area (e.g. restrictive conveying elements have a shorter pitch and higher residence times, and the pressure in the zone is increased), and their function (such as reverse flow), and the radial clearance of the tips between the barrel or an adjacent screw element.

Restriction Factors assigned for specific screw elements are given below:

| SCREW ELEMENT | Restriction Factor |
| --- | --- |
| FC = Forward Convey (R) | 1 |
| KBFC = Kneading Block (R) | 2 |
| LHKB = Left (L) Hand Kneading Block | 6/3 |
| LHCE = (L) Convey Element | 50/15 |
| SFF = Low pitch Single Flight Forward | 4 |
| LHNI = Left Hand Igel | 2.5 |
| SPEF = Special Elongational Flow Element | 2.5 |
| KBNC = Kneading Block Neutral (N) Convey | 3.5 |
| ZME, SME, TME, (R) | 3 |
| ZME, SME, TME, (L) | 4 |
| Elongational Flow element | 8 |
| SFL = low pitch single flight, Left Hand convey, | 55/20 |

The ZME, SME and TME elements are also characterized as 'gear type', highly distributive elements described in literature from Coperion Corporation, Ramsey, N.J.

The SFL, LHKB and LHCE elements are considered to have a higher restrictive factor (55, 6 and 50 respectively) when placed after mixing elements, and a less restrictive effect when placed after a conveying element (20, 3 and 15 respectively). Higher restrictive factors are assigned when more than one left-handed element is located next to another left-handed element.

Those skilled in the art will recognize that known screw elements may be modified, and that substitute screw elements can be used. Although refining the restriction factors for such elements may take several iterations, one skilled in the art will be able to determine the restriction factors for such modified screw elements and substitute screw elements, and such substitutions may be made within the bounds of the invention.

With reference now to FIG. 7, in screw profile A, many of the flow zones are similar to those seen in screw profile B, the difference being that more kneaders are used in screw profile A, and neutral (N) kneaders are used in flow zones (96), (98), (100) and (102).

Screw profile A is considered to be more restrictive than screw profile B, and the differences can be quantified by the number of intermeshes produced by each screw profile.

To describe the mixing value of a particular screw profile in absolute terms, it is expedient to describe the screw in terms of its meshes, i.e. the mixing potential of the screw independent of the rate of rotation, L/D and the number of screws used. By dividing the number of meshes for a screw design with its L/D, a calculation for number of meshes per L/D for that screw design can be obtained.

For dynamic cross linking processes, it is believed that screws with up to 17 meshes per L/D, and L/D up to 100 with up to 170 mixing zones can be used. For mixing a rubber with a thermoplastic polymer without cross linking, it is believed that screws as short as L/D 15, with as little as 3 mixing zones and 9 meshes per L/D can be used. Accordingly, mixing of a thermoplastic polymer and a cross-linkable rubber and curing at least partially according to the invention may be carried out using screws having a L/D of 15-100, with 3-170 mixing zones, and 3-17 meshes per (L/D). In both the examples below, for dynamic cross-linking, 10-13 meshes per (L/D) were used.

Calculations for meshes of individual elements are given in the meshes table below. In the table, the element is described by type, the pitch factor, the length factor (given in L/D), the number of flights tips on the element, and the restriction factor. The last column shows the mixing potential for the element in meshes.

In the calculations, the pitch factor=screw diameter/pitch, for example, 30 mm/60 mm=0.5. This applies to SG, SK and S elements, but not to KBS, Igel, LH elements or kneading blocks. The length factor applies to all elements.

The no. of tips for the element in the table is the number of flights×the number of elements or disks, which is 1×1=1 for a single flighted element or disk. For double flighted elements, the number of tips is 2×5=10 for a 5 disk double flighted kneading block, 2×5=10 for a double flighted 5 segmented Igel, and 2×6=12 for a six segmented SG element. For triple flighted kneading block with 5 disks, the number of tips is 3×5=15. By following these examples, this calculation can be used for convey or mixing elements with >3 flights.

The calculated meshes are the pitch factor×length factor× no. of tips×restriction factor for 30 mm diameter screws.

Table of Meshes

| Element | Element Type | Pitch factor | Length or L/D Factor | No. of Flight Tips | Restriction Factor | Effective meshes |
|---|---|---|---|---|---|---|
| SK060R060 | Convey | 0.5 | 2 | 2 | 1 | 2 |
| SK060R030 | Convey | 0.5 | 1 | 2 | 1 | 1 |
| S060R060 | Convey | 0.5 | 2 | 2 | 1 | 2 |
| S060R030 | Convey | 0.5 | 1 | 2 | 1 | 1 |
| S040R040 | Convey | 0.75 | 1.33 | 2 | 1 | 2 |
| S040R060 | Convey | 0.75 | 2 | 2 | 1 | 3 |
| S030R015 | Convey | 1.0 | 0.5 | 2 | 1 | 1 |
| S030R030 | Convey | 1.0 | 1 | 2 | 1 | 2 |
| S030R060 | Convey | 1 | 2 | 2 | 1 | 4 |
| KBS405R020 | Mixing | 1 | 0.67 | 10 | 2 | 13 |
| KBS405R030 | Mixing | 1 | 1 | 10 | 2 | 20 |
| KBS405R040 | Mixing | 1 | 1.33 | 10 | 2 | 27 |
| KBS905R030 | Mixing | 1 | 1 | 10 | 3.5 | 35 |
| KBS905R040 | Mixing | 1 | 1.33 | 10 | 3.5 | 47 |
| KBS903R030 | Mixing | 1 | 1 | 6 | 4.5 | 27 |
| KBS903R040 | Mixing | 1 | 1.33 | 6 | 4.5 | 32 |
| KBS405L020 | Mixing | 1 | 0.67 | 10 | 6/3 | 40/20 |
| KBS405L030 | Mixing | 1 | 1 | 10 | 6/3 | 60/30 |
| S030L015 | Mixing | 1 | 0.5 | 2 | 50/15 | 50/15 |
| S030L020 | Mixing | 1 | 0.67 | 2 | 50/15 | 67/20 |
| S030RL030Igel | Mixing | 1 | 1 | 10 | 2.5 | 25 |
| S030RL040Igel | Mixing | 1 | 1.33 | 10 | 2.5 | 33 |
| SG690075R060 | Mixing | 0.43 | 2 | 12 | 3 | 31 |
| ZME, SME, TME | Mixing | | | | 55/20 | |
| SE010L030 | Mixing | 3 | 1 | 1 | 55/20 | 165/60 |
| SE012.5R031.25 | Mixing | 2.4 | 1.04 | 1 | 4 | 10 |
| SE015R030 | Mixing | 2 | 1 | 1 | 4 | 8 |
| SE010R030 | Mixing | 3 | 1 | 1 | 4 | 12 |

Mixing elements such as ZME, TME, SME, and elongational flow elements have meshes of 20, 15, 10, and 35, respectively. Calculations shown can be applied to elements of any diameter, L/D, number of flights or lobes, or number of disks. One skilled in the art will be able to use their own calculations for determining the number of intermeshes used in a particular extrusion. For example, if a screw has 396 meshes, and 6 screws are used at 360 RPM, the number of intermeshes/sec will be 396×6/sec×6=14,256.

For making softer thermoplastic vulcanizates, a screw profile comprising 13 to 21 mixing zones of which 45 to 55% are conveying elements in 6-8 zones, 4-5% are flow splitters in 1-3 zones, 16 to 24% are restrictive conveying elements in 1-3 zones, 15 to 20% are pitched kneaders in 2-4 zones and 1 to 5% are back flow elements in 1-3 zones, wherein the screw has a mixing potential of 343 to 650 meshes can be used. It is preferred that the L/D ratio of screw profiles useful in the invention is from L/D 36 to L/D 60.

In the illustrated embodiment of FIG. 6, a screw profile having 15 mixing zones wherein the mixing zones, in sequence, have 3-7, 10-30, 1-3, 47-87, 3-7, 75-155, 3-7, 15-45, 3-6, 88-138, 4-8, 70-110, 3-6, 15-35, and 3-6 meshes, and a total of 343-650 meshes is provided.

With reference to FIG. 6, a screw profile B of the invention, with particular utility for making extrudates having a Shore A hardness of less than 80, preferably less than 60, and in particular less than 35, has a sequence of: SK060R060, SK060R030, SKN60R030, S040R020, KBS405R030, S030R015, KBS405R040, KBS405L020, S060R060, S060R030, KBS405R030, KBS405R040, S030L015, S040R060, S030R030, SG690075R060, S030R030, S060R060, S040RL040 Igel, SE012.5R031.25, SE015R030, SG690075R060, SE010R030, SE012.5R031.25, SE015R030, S030R015, SK060R060, SKN60R030, S040R020, KBS405R030, KBS405R030, S030L015, S060R060, S040R040, S030RL030 Igel, S030R015, S030R060.

Screw profile B comprises flow zones (71-85). Element (87) is a seal used to prevent materials from being trapped at the beginning of the barrel and does not provide any mixing. Conveying zones (the odd numbered zones) define or separate the different mixing zones (even numbered zones).

Calculations for the conveying elements are illustrated for flow zones (71) and (75). Flow zones (71) and (75) comprise conveying elements having 5 meshes. At 560 RPM, the screw rotates at 9.3333 turns per second, and the conveying elements provide 5×9.33=46.7 meshes/sec to the extruding material. If twelve screws are used in the extruder, 12×46.7=560 intermeshes/sec are provided by each of these mixing zones.

In the illustrated embodiment, the conveying flow zones, (71), (73), (75), (77), (79), (81), (83), and (85) provide, respectively, 5, 1, 5, 5, 4, 6, 4 and 5 meshes. The meshes of the mixing zones with the B screw profile are shown in the Table I below.

TABLE I

| FLOW ZONE | element | meshes | L/D factor | Total Zone Meshes |
|---|---|---|---|---|
| 72 | KBFC | 20 | 1.0 | 20 |
| 74 | KBFC | 27 | 1.33 | |
| | LHKB | 40 | 0.67 | 67 |
| 76 | KBFC | 20 | 1.0 | |
| | KBFC | 27 | 1.33 | |
| | LHCE | 50 | 0.5 | 97 |
| 78 | SPEF | 31 | 2.0 | 31 |
| 80 | LHNI | 33 | 1.33 | |
| | SFF | 10 | 10.4 | |
| | SFF | 8 | 1.0 | |
| | SPEF | 31 | 2.0 | |
| | SFF | 12 | 1.0 | |
| | SFF | 10 | 1.04 | |
| | SFF | 8 | 1.0 | 113 |
| 82 | KBFC | 20 | 1.0 | |
| | KBFC | 20 | 1.0 | |
| | LHCE | 50 | 0.5 | 90 |
| 84 | LHNI | 25 | 1.0 | 25 |

The B screw profile has a length of 1317.5 mm, and an L/D of 43.92 wherein the L/D in the mixing elements is 19.75. The total calculated meshes for the screw profile is 477, of which, 7% are provided by the conveying elements. The calculated meshes per L/D for screw profile B=477(meshes)/43.92 (L/D)=10.86. The curing agent was added to the melt processed blend of thermoplastic polymer and vulcanizable elastomer in at least one location in the first 46% of the length of the extruder, but alternatively it could have been done by adding at least one of curative or coagent to the extruder with this screw design and the remaining curing agent in the second extruder, so as to initiate curing of the blend. The vulcanizable elastomer was then cured at least partially by reactive melt processing. In a ring extruder using 12 intermeshing screws at 560 RPM, screw profile B provides 53,424 intermeshes/sec to the extrudate. When the residence time of the extrudate is known, the total number of intermeshes applied can be calculated.

Those skilled in the art will recognize that the calculations will be modified to take into account the different screw elements when the screw elements in each of the screws are not the same.

With reference to FIG. 7, the A screw profile comprises 15 to 19 mixing zones of which 60 to 70% are conveying elements in 7 to 9 zones, 2-3% are flow splitters in 1-2 zones, 7 to 9% are non-pitched kneaders in 3-5 zones, 18 to 22% are pitched kneaders in 5-7 zones and 1 to 3% are back flow elements in 1-2 zones, wherein the screw has a mixing potential of 385 to 742 meshes.

Specifically, screw profile A has 17 mixing zones wherein the mixing zones, in sequence, have 3-7, 5-25, 1-3, 40-80, 3-7, 82-142, 3-7, 68-113, 3-7, 28-68, 4-8, 50-108, 3-7, 70-110, 3-7, 15-35, and 4-8 meshes, with a total of 385-742 meshes.

For a 12 screw ring extruder of L/D=44 with each screw design having 742 meshes, rotating at a speed of 1200 RPM, the number of intermeshes per L/D per Sec can be calculated as:

742 meshes×1200 RPM×12×(1 Min/60 Sec)×(1/44 L/D)=6047

The screw profile A has the following sequence: SK060R060, SK060R030, SKN60R030, S040R020, KBS405R020, S030R015, KBS405R030, KBS405L020, S040R060, S030R030, KBS905N030, KBS405R040, S030L015, S040R060, S030R030, KBS905N030, KBS405R020, KBS405L020, S040R060, S030R030, KBS905N030, KBS405R020, S030R030, SK060R060, S030R030, KBS905N030, KBS405R020, KBS405L020, S030R030, SK060R060, S030R030, KBS405R030, KBS405R030, S030L015, S040R060, S040R040, S030RL030 Igel, S040R020, S030R015, S030R060.

Calculations have been made for the 17 flow zones of screw profile A, and the results are given below. Screw profile A, in the illustrated embodiment, comprises flow zones (91-107), wherein conveying zones (the odd numbered zones) define or separate the different mixing zones (even numbered zones). In the illustrated embodiment, the conveying flow zones, (91, 93, 95, 97, 99, 101, 103, 105 and 107) provide, respectively, 5, 1, 5, 5, 5, 6, 6, 5, and 6 meshes. The meshes provided by the mixing zones with the screw Profile A are shown in the Table II below.

TABLE II

| Flow Zone | element | meshes | L/D factor | Total Zone Meshes |
|---|---|---|---|---|
| 92 | KBFC | 13.33 | 0.67 | 13.33 |
| 94 | KBFC | 20 | 1.0 | |
| | LHKB | 40 | 0.67 | 60 |
| 96 | KBNC | 35 | 1.0 | |
| | KBFC | 26.67 | 1.33 | |
| | LHCE | 50 | 0.5 | 111.67 |
| 98 | KBNC | 35 | 1 | |
| | KBFC | 13.33 | 0.67 | |
| | LHKB | 40 | 0.67 | 88.33 |
| 100 | KBNC | 35 | 1 | |
| | KBFC | 13.33 | 0.67 | 48.33 |
| 102 | KBNC | 35 | 1 | |
| | KBFC | 13.33 | 0.67 | |
| | LHKB | 40 | 0.67 | 88.33 |
| 104 | KBFC | 20 | 1 | |
| | KBFC | 20 | 1 | |
| | LHCE | 50 | 0.5 | 90 |
| 106 | LHNI | 25 | 1 | 25 |

TABLE II-continued

| Flow Zone | element | meshes | L/D factor | Total Zone Meshes |
|---|---|---|---|---|

The A screw profile has a L/D of 43.67 with a length of 1310 mm, wherein the mixing elements have a L/D of 15. The total calculated meshes for the screw profile is 569, of which, 7.7% are provided by the conveying elements. The calculated meshes per L/D for screw profile A=569 (meshes)/43.67 (L/D)=13.03. Again, the curing agent was added to the melt processed blend of thermoplastic polymer and vulcanizable elastomer in at least one location in the first 46% of the length of the extruder, but alternatively it could have been done by adding at least one of curative or coagent to the extruder with this screw design and the remaining curing agent in the second extruder, so as to initiate curing of the blend. The vulcanizable elastomer was then cured at least partially by reactive melt processing.

Screw profile A in a ring extruder using 12 screws provides 63,728 intermeshes/sec to the extrudate at 560 RPM.

The melt temperature of thermoplastic polymers used to produce thermoplastic vulcanizates may be as low as 40-120° C., for example syndiotactic polypropylene, whereas the melting point of nylon, for example, can be as high as 350° C. The friction and viscous dissipation created in the material, as it is sheared and dispersed, determines the temperature of the material in the melt zone. As the pellets or granulated material begins to melt, friction decreases, and the temperature levels off, but can be further manipulated depending on processing requirements. Cross-linking of rubber, depending somewhat on the functional groups present, and the chemistry of the rubber, usually takes place between 165 and 250° C., and for most rubbers used in the processing of thermoplastic vulcanizates, cross-linking takes place between 175 and 230° C.

Residence times for the processing using the ring extruder were determined empirically by adding color to the feed throat of the extruder after the start of extrusion from the die, and measuring the time it took for a color change to appear at the extrusion die. In one such test, a ring extruder having a feed rate of 100 kg/hr at 400 RPM showed a residence time of 44 seconds. For desired properties, residence times of 15 to 180 seconds are required, depending on the materials being processed.

Because there is a delay in cross linking while the ingredients mix during extrusion, and because temperatures are developed more gently and because mixing is taking place in these flow zones, large agglomerations of cross-linked elastomer are not formed. That is, small, fully cross linked particles are formed under high shear, and the cross linking and the thermoplastic phase prevents the cross linked particles from combining with additional elastomer as extrusion continues. The ring extruder facilitates this process by providing an efficient mixing. It has been discovered, as illustrated below, that increased cross linking can be obtained using the processes of the invention, while the energy required for processing is reduced.

It has also been discovered, as illustrated in EXAMPLE 2 below, that the mixing is sufficiently efficient that reduced amounts of curatives can be used to produce product having desired properties. In EXAMPLE 2, it is shown that what was considered by the prior art to be the optimal amount of curative can be replaced by about 0.75 of the prior art amount, and substantially similar properties can be achieved.

As is apparent from the foregoing description and the following examples, a mixture of two or more thermoplastic polymers may be used to form a thermoplastic vulcanizate, and mixtures of two or more rubbers may be used. Catalysts may be added in solid form or in solution, and solution catalysts may be concentrated or dilute. Oil may be added in one location or a plurality of locations, in order to control the temperature and the consistency of the composition as it is being processed, as well as to control the properties of the vulcanizate.

Those skilled in the art will recognize that oil extended rubber is a dominant choice for use in forming thermoplastic vulcanizates, and consequently, some prior art methods use the amount of oil extended rubber (including the oil) in calculating the percentage of thermoplastic polymer used, and some recalculation may be necessary to provide an accurate comparison of the percentages described herein with some prior art references.

It has been shown in the examples herein that processing is optimized at lower screw speeds, and that the B screw profile has utility in all catalyst systems, whereas prior art processing in twin screw extruders uses different screw profiles for different catalyst systems.

It will be seen from the examples that when using twin screw extruders, the specific energy of the various processes are generally about 0.30 to 0.36 Kw hr/Kg., whereas using the ring extruder, specific energy of the extrusion is about ⅔ as much. In general, the specific energy using the ring extruder has been reduced to about 0.17 to 0.28 Kw hr/Kg.

In order to make comparisons using the twin screw extruder as illustrated in the examples, a rotation speed of 300 RPM was used. These comparative examples were prepared in a co-rotating, fully intermeshing type twin screw extruder with L/D=46.6, supplied by Coperion Corp., Ramsey, N.J. in accordance with the method described in U.S. Pat. No. 4,594,294.

The invention is further illustrated with reference to the following examples.

EXAMPLE 1

In this EXAMPLE, properties of thermoplastic vulcanizates made using screw profiles A and B in a ring extruder were examined. Four experimental thermoplastic vulcanizates (TPVs) were made using screw profile A, and three TPVs were made using screw profile B. For each TPV, a phenolic resin cure was used. The experimental compositions were compared with a comparative example product made by processing in a twin screw extruder.

Isotactic polypropylene (PP) was used as the thermoplastic polymer. In this and the following examples, unless otherwise specified, the PP used is high molecular weight F008F PP from Sunoco Inc. (Chemicals) or 5341 PP from ExxonMobil Chemical Co., or low molecular weight F180A PP from Sunoco Inc. (Chemicals), or a blend of two or all three of the polypropylenes. EPDM V3666 from ExxonMobil Chemical Co. was used as the rubber component.

In this and the following examples, unless otherwise specified, 'phenolic resin cure' refers to phenolic resin HRJ 14247A, available from Schenectady Chemical. It is in conjunction with 1.26 phr stannous chloride catalyst (Stanchlor Anhydros™, available from Mason Corp.) and 2 phr ZnO (Kadox® 911, Zinc Corp. of America).

The formulation for this invention example and comparative comprised the following (in phr): PP=34, EPDM rubber (V3666, ExxonMobil Chem. Co.)=175 (of which 75 phr was extender oil), zinc oxide=2.0, stannous chloride=1.26, process oil=59.1, HRJ-14247A=8.4 (of which 5.88 phr was diluent oil), clay (Icecap K®, Burgess Pigment Co.)=42, and wax (Okerin 2709 Astor® of Honeywell)=3.27.

The TPV was made using a total feed rate of 200 Kg/Hr of at 560 RPM. The composition comprised 34 parts PP per 100 parts rubber (phr). 134.1 phr total oil was used. The PP comprised 25.4 wt. %.

The reactions were carried out so that the barrel temperature profile set points of each of the TPVs was the same. Barrel temperature setting for phenolic resin cure was feed barrel=cooling; barrel sections 2-6=180° C. (356° F.); barrel sections 7-11=170° C. (338° F.); barrel sections 12-14=160° C. (320° F.); Die=200° C. (392° F.).

The curative was diluted in oil, and additional oil was added in processing down stream of the addition of the curative. For screw profile B, 10% of the oil was added before the addition of the curative, and for screw profile A, 25% of the oil was added before addition of the curative. The processing oil used herein, unless otherwise specified was paraffinic oil Sunpar 150M., from R. E. Carol. Processing oil, in this and the following examples, was used as a plasticizer. Low molecular contaminants, reaction by-products, residual moisture and the like were removed by venting in two locations, though more can be used as needed.

In this example, the curative was added at barrel segments 23, 25 or 27, and the results are shown in Table 1. The phenolic cure system was provided at two different radial locations at the same L/D in equal amounts in experiment 7.

whether or not the elastomer is oil extended, and how much, in TPVs having the same composition, the values show the amount of cross-linking of the vulcanizates relative to each other.

TnSet % is the tension set, which is a measure of the permanent deformation of the TPV when it is stretched. A test specimen of dimensions 50.8 mm (2 in.) long, 2.54 mm (0.1 in.) wide and 2.03 mm (0.08 in.) thick, cut from an injection molded plaque is stretched to 100% and held for 10 minutes at 23° C. It is then allowed to relax at 23° C. for 10 minutes. The change in the length of the origian specimen is measured and the TnSet % is calculated according to the formula:

$Tn$Set $\% = ((L_1 - L_0)/L_0) \times 100$, where $L_0$ is the original length and $L_1$ is the final length.

ESR is a measure of the surface smoothness of the TPV, where lower numbers indicate a more smooth surface. The ESR was measured using a Surfanalizer, supplied by Federal, in accordance with the manufacturer's instructions.

UTS is the ultimate tensile strength, and is given is force per unit area in accordance with ASTM D412 (ISO 37 type 2).

SpE is the specific energy of the extrusion process in KW-Hr/Kg, and is a measure of the processing efficiency.

TABLE 1

| | Comp. I Average | Comp. I Std Dev. | Exp. # 1 | 2 | 3 | 4 | 5 | 6 | 7 |
|---|---|---|---|---|---|---|---|---|---|
| Screw Des | | | B | B | B | A | A | A | A |
| LocCur | | | 23 | 25 | 27 | 23 | 25 | 27 | 25 |
| Hard(Sh A) | 59.8 | 1.0 | 60.8 | 56.9 | 57 | 55.3 | 54.5 | 51.7 | 54.9 |
| M100 | 268/ | | 289/ | 222/ | 260/ | 235/ | 222/ | 185/ | 220/ |
| (psi/MPa) | 1.85 | | 1.99 | 1.53 | 1.79 | 1.62 | 1.53 | 1.28 | 1.52 |
| UE % | 415 | | 338 | 375 | 279 | 436 | 398 | 380 | 362 |
| WtGn % | 106.9 | 4.2 | 80.5 | 131.0 | 156.5 | 109 | 113 | 196 | 118 |
| TnSet % | | | 7.5 | 9.0 | 12.0 | 7.5 | 7.5 | 15.0 | 7.5 |
| ESR | 102 | 23 | 124 | 126 | 241 | 143 | 136 | 361 | 128 |
| UTS | 717/ | 50/ | 698/ | 524/ | 418/ | 755/ | 613/ | 333/ | 533/ |
| (psi/Mpa) | 4.94 | 0.34 | 4.81 | 3.61 | 2.88 | 5.21 | 4.23 | 2.30 | 3.67 |
| SpE | .358 | | .203 | .221 | .221 | .234 | .242 | .246 | .249 |

The abbreviations of the table are explained below

LocCur is the location of the barrel segment where the resin curative was added.

Hard is the hardness of the TPV, measured in Sh A or Sh D units in accordance with ASTM D2240.

M100 is the modulus of the material, and the M100 test indicates resistance to strain at 100% extension in force per unit area in accordance with ASTM D412 (ISO 37 type 2).

UE % is ultimate elongation, and indicates the distance a strand of the material can be stretched before it breaks in accordance with ASTM D412 (ISO 37 type 2).

WtGn % is a measurement of the amount of oil absorbed by the sample in an oil swell resistance test. Such a test is shown in U.S. Pat. No. 6,150,464. The test is based on ASTM D471 and ISO 1817, and requires a sample of TPV to be immersed in IRM 903 oil for 24 hours at 121° C. The weight gain percentage is a measure of the completeness of the cross-linking of the vulcanizate. Although weight gain values can vary depending on SpE is measured by dividing the total power in KW, consumed by the extruder with the production rate in Kg/hr.

Std. Dev. is the standard deviation, which is an estimate of the measure of how widely values $(X_n)$ are dispersed from the average or mean value $(X_{ave})$. It includes variations from raw material supply sources, process sampling, test sample preparation, testing and operators and the like. It is calculated using the n−1 method, with n>21, as shown below:

$\text{Std.Dev.} = [((X_1 - X_{ave})^2 + (X_2 - X_{ave})^2 + (X_3 - X_{ave})^2 + \ldots (X_n - X_{ave})^2)/(n-1)]^{0.5}$ The data indicates that the processing efficiency of the ring extruder is better than that of the twin screw extruder used to make the comparative example, and shows better properties for TPVs made using screw profile B over screw profile A, and better properties for screw profile B when addition of the resin cure took place at barrel segment 23. The hardness of the extrudate produced by screw profile B is comparable to the comparative example (Comp I). Screw profile B, with curative injection at barrel segment 23, shows better properties for weight gain percentage, tension set and surface smoothness. The UTS is down slightly, but is close to being within one standard deviation of the comparative example.

EXAMPLE 2

This example shows the difference in properties resulting by varying the amount of curative used during processing. In this example, resin diluted in process oil was added at barrel segment 23 for all runs, but the amount of resin was varied. The same materials described in EXAMPLE 1 were used. Screw profile B as used in producing this example. The TPV described is a carbon black reinforced composition, and 9.6 phr carbon black was used. Each of the compositions included 41.5 phr PP and 142.7 phr oil. The PP comprised 29.3 wt. % based upon the weight of thermoplastic plus cross-linked rubber. All samples were run at 560 RPM. The compositions varied slightly, as indicated in Table 2.

The formulations for the invention and comparative examples comprising the following (in phr): PP=27.08, EPDM rubber (V3666, ExxonMobil Chem. Co.)=175 (of which 75 phr was extender oil), zinc oxide=2.0, stannous chloride=1.26, process oil=62.4, HRJ-14247A=7.58 (of which 5.31 phr was diluent oil), clay (Icecap K®, Burgess Pigment Co.)=42, wax (Okerin 2709 Astor® of Honeywell) =3.25, carbon black (Ampacet Co.)=23.96 (of which 14.4 phr was PP carrier resin).

The data indicates that the TPV made using 100% curative (2.2 phr), based on what has been found to be necessary for the same composition processed in a twin screw extruder (comparative example), showed generally better physical properties as compared to TPVs made using reduced amounts of resin, and increased amounts of resin, although the compositions made using 75% (1.7 phr) of the accepted amount of curative showed properties reasonably close to the comparative example. This indicates that 100% curative, as compared to the twin screw extrusion comparative example, is an optimal amount for the mixing dynamics of the ring extruder, but mixing is sufficiently improved such that adequate properties can be obtained when the amount of curative is reduced up to 25%.

The 2.27 phr curative represents 100% of the amount used in the comparative example, 2.68 represents 118% of the amount used in the comparative example, and 1.71 phr and 1.14 phr represent 75% and 50% of the comparative example, respectively.

TABLE 2

| | Exp. No. | | | | |
| --- | --- | --- | --- | --- | --- |
| | Comp. II | 8 | 9 | 10 | 11 |
| phenolic resin | 2.27 phr | 2.27 phr | 2.68 phr | 1.71 phr | 1.14 phr |
| Hard (Sh A) | 62.4 | 62.4 | 58.7 | 60.7 | 58.1 |
| M100 (psi/MPa) | 307/2.12 | 300/2.07 | 280/1.93 | 278/1.92 | 242/1.67 |
| UE % | 441 | 459 | 417 | 461 | 541 |
| WtGain % | 104.5 | 85 | 96.5 | 101.5 | 142.5 |
| UTS (psi/MPa) | 856/5.90 | 918/6.33 | 884/6.09 | 792/5.46 | 674/4.65 |
| ESR | 78 | 129 | 155 | 97 | 65 |
| SpE | 0.331 | 0.221 | 0.236 | 0.222 | 0.229 |

EXAMPLE 3

In this example, the effect of extruder RPM is shown. The formulation were the same as in EXAMPLE 1. In the example, all samples had a 200 Kg/Hr feed rate, and the weight percentage of PP used was 25.4%. All other parameters for the experimental TPVs were the same. The A screw profile was used, and resin diluted in process oil was injected at barrel segment 25, and in processing, additional oil was added up and down stream of the addition of the curatives. The data in table 3 indicates that lower rpms, and probably the resultant increased residence time, causes an improvement in physical properties.

TABLE 3

| | Ex. # | | | |
| --- | --- | --- | --- | --- |
| | Comp. I | 12 | 13 | 14 |
| RPM | 300 | 400 | 560 | 840 |
| Hard(Sh A) | 59.8 | 57.9 | 54.5 | 53.6 |
| WtGn % | 106.9 | 99.5 | 113 | 165.5 |
| Tension Set % | NA | 7.5 | 7.5 | 10 |
| UTS(psi/MPa) | 717/4.94 | 691/4.76 | 613/4.23 | 458/3.16 |
| M100(psi/MPa) | 268/1.85 | 254/1.75 | 222/1.53 | 201/1.39 |
| UE % | 415 | 439 | 398 | 462 |
| ESR | 102 | 117 | 136 | 190 |
| SpE | 0.358 | 0.210 | 0.242 | 0.306 |

Specific Energy was increased at 840 RPM, but was still significantly less than the twin screw extruded comparative example.

EXAMPLE 4

In this example, the processing characteristics of the ring extruder for making soft compositions was explored. The same formulation was used as in EXAMPLE 1 with the exception of the amounts of PP and process oil, see below. The B screw design was used and feed rate was maintained at 150 Kg/Hr, phenolic resin in oil was used as the curative, and the phenolic resin was injected into barrel segment 23. In processing, additional oil was added up and downstream of the addition of the curative. The extruder was run at 840 RPM.

Because of the variability of the oil content used in the examples, the weight gain obtained by the absorption of oil does not give a meaningful indication of the completeness of the cross-linking of the elastomer. The data in Table 4 shows that the physical properties, tension set and UTS, are very good considering the softness of the TPVs. Physical properties declined as the amount of PP was reduced, but maintained acceptable levels.

TABLE 4

| | Exp. # | | |
| --- | --- | --- | --- |
| | 15 | 16 | 17 |
| PPwt. %(phr) | 17.3 (20.9) | 11.5 (13) | 13.8 (16) |
| Total Oil(phr)[1] | 160.4 phr | 196.5 phr | 176.5 phr |
| Hard(Sh A) | 42.2 | 28.4 | 37 |
| ESR | 119 | 121 | 105 |
| UTS(psi/MPa) | 460/3.17 | 201/1.39 | 359/2.48 |
| M100(psi/MPa) | 153/1.05 | 85/0.59 | 130/0.90 |
| UE % | 323 | 234 | 295 |
| TnSet % | 5 | 5 | 5 |
| SpE | .278 | .257 | .244 |

[1]Includes oil extension in rubber and added oil in the mixing process.

EXAMPLE 5

In this example, properties of soft thermoplastic vulcanizates were studied varying the amounts of PP and oil used. Additional studies were done to measure the affect of RPM on properties. The B screw profile was used, and the feed rate was maintained at 150 Kg/Hr. A hydrosilation (SiH) cure was used, specifically 2-5084 Silicon Hydride from Dow Corning. The silicon hydride curative was added at barrel segment 23, and platinum catalyst was added at barrel segment 25. The platinum catalyst was PC085 from United Chemical Technology. 0.66 phr SiH was used in experiments 18 and 19, and 0.83 phr was used in experiment 20. Platinum catalyst, 0.066 phr, was used in each of the examples. Unless otherwise stated, the SiH curatives used in this and the following examples were polymethyl siloxanes and copolymers thereof, available from Dow Corning.

The rubber used was Vistalon® VX 1696 from ExxonMobil Chemical Co., and the PP used was either Sunoco Inc. (Chemicals) D008F or ExxonMobil Chemical Co. PP 5341. The oil was paraffinic oil Chevron 6001R, purchased from Renkert. The resulting formula for these invention examples comprised the following (in phr); PP=15-31, EPDM rubber=200 (of which 100 phr was extender oil), zinc oxide=2.0, platinum catalyst solution=3.0-3.75 (0.022 wt % metal complex in oil), process oil=138.5-175.5, silicon hydride=3.01-3.76, clay=42.

Barrel temperature for the hydrosilation cure was the same as that of EXAMPLE 1.

The Table 5 data shows the affect of varying oil and PP content while maintaining the extruder at 560 RPM. The product from Experiment 19 is illustrated in FIG. 8 to show the morphology.

TABLE 5

| | Exp. # | | |
|---|---|---|---|
| | 18 | 19 | 20 |
| PP % (phr) | 23.7 (31) | 18.7 (23) | 13.0 (15) |
| Total Oil(phr) | 241.5 | 261.5 | 282.3 |
| ESR | 631 | 503 | NA |
| Hard(Sh A) | 32.8 | 27.1 | 12.9 |
| UTS(psi/MPa) | 251/1.73 | 195/1.34 | 150/1.03 |
| M100(psi/MPa) | 116/0.80 | 91/0.63 | 67/0.46 |
| TnSet % | 7.5 | 7.5 | 10 |
| UE % | 253 | 276 | 225 |
| SpE | 0.193 | 0.186 | 0.175 |
| Wt. Gn. % | 114 | 138.5 | 122 |

Table 6 shows the affect of ring extruder RPM on the softest TPV identified in Table 5. The properties of Sample 20 were determined for TPVs made at 380, 560 and 840 RPM.

TABLE 6

| | Exp. No. | | |
|---|---|---|---|
| | 20 | 21 | 22 |
| Screw Speed (RPM) | 560 | 380 | 840 |
| PP % | 13 | 13 | 13 |
| Free Oil % | 40.1 | 40.1 | 40.1 |
| Total Oil % | 62.6 | 62.6 | 62.6 |
| Wt. Gain % | 122 | 121 | 172 |
| Hard(Sh A) | 12.9 | 14.2 | 12.4 |
| UTS(psi/MPa) | 150/1.03 | 147/1.01 | 149/1.03 |
| M100(psi/MPa) | 67/0.46 | 68/0.48 | 61/0.42 |
| UE % | 225 | 205 | 254 |
| TnSet % | 10 | 7.5 | 10 |

TABLE 6-continued

| | Exp. No. | | |
|---|---|---|---|
| | 20 | 21 | 22 |
| SpE | 0.175 | 0.128 | 0.215 |

The data indicates better properties at lower RPM, with a significant decline in oil swelling properties, decline in elongation properties and increase in M100 for the TPV compared to those mixed at 840 RPM.

EXAMPLE 6

This example further illustrates the mixing capability of the ring extruder for thermoplastic vulcanizates. In this example, similar compositions have been processed in a twin screw extruder and in a ring extruder. The B screw design was used for all the ring extrusion examples of the invention, and the comparative examples were prepared as above in Example 1. Although the compositions used to prove the concept cannot be correlated exactly, the differences seen are required by processing differences in the equipment, and the compositions of each of the comparative samples are the same.

Comparisons were done for four compositions in Table 7, and in the columns, data given for a twin screw extruder (TS) in each comparison is shown on the left, and the data for the ring extruder (RE) is given on the right. The oil splits are given as pre-cure %/post-cure %. Curing agents used are identified as 'Cure', where N indicates phenolic resin, SiH indicates silicon hydride and 'perox' indicates peroxide, and 'inj. pt.' denotes their injection point defined as the L/D from the feed throat. The peroxide cure used was 2,5 dimethyl-2,5-di(t-butylperoxy)hexane (DBPH), where triallylcyanurate (TAC) is used as a co catalyst. The formulation for the 1 TS and 1 RE was the same as that described in EXAMPLE 1. The formula for 2 TS and 2 RE was the same as that described in EXAMPLE 2. The formulation used for 3 TS and 3 RE comprised (in phr): PP=50, EPDM (VX 1696)=200 (of which 100 phr was extender oil), zinc oxide=2.0, platinum catalyst solution=2.5 (0.022 wt. % metal in oil), process oil=65.5, silicon hydride=2.51, clay (Icecap K®)=42. The formulation for 4TS and 4RE (in phr) was PP=46, EPDM (V3666)=175 (of which 75 phr was extender oil), zinc oxide=1.94, TAC=6.0, process oil=56.7, DBPH=6.5 (50 wt. % peroxide in oil), clay (Icecap K®)=42, wax (Okerin 2709 Astor® of Honeywell)=3.27, stabilizer (Irganox® 1010 from CIBA Specialty Chemicals)=2, carbon black (49974 black concentrate, Ampacet Co.)=24.4 (of which 14.6 phr was PP carrier resin).

The peroxide cure used the following barrel temperature set points. Feed Barrel=cooling; barrels 2-5=130° C. (266° F.); barrels 6-11=142° C. (268° F.); barrels 12-14=125° C. (257° F.); and Die=200° C. (392° F.).

Samples 2 TS, 2 RE, 4 TS, and 4 RE were carbon black reinforced by introduction of the carbon black as pellet concentrates after crosslinked/curing of the rubber phase to allow incorporation principally into the thermoplastic phase.

TABLE 7

| Exp. # | Extruder | | | | | | | |
|---|---|---|---|---|---|---|---|---|
| | 1 TS Comp. I | 1 RE 1 | 2 TS Comp. II | 2 RE 8 | 3 TS Comp. III | 3 RE 23 | 4 TS Comp. IV | 4 RE 24 |
| PP % | 25.4 | 25.4 | 29.3 | 29.3 | 33.3 | 33.3 | 37.7 | 37.7 |
| Oil split | 10/90 | 11/89 | 0/100 | 25/75 | 10/90 | 10/90 | 7/93 | 25/75 |
| cure | N | N | N | N | SiH | SiH | perox | perox |
| inj. pt.* | 0/22.5 | 0/8.8 | 0/15 | 0/8.8 | 25.5/7.5 | 20.7/8.8 | 0/12 | 0/8.8 |
| Hard(Sh | 59.8 | 60.8 | 62.4 | 62.4 | 65.3 | 65 | 68 | 70.7 |
| WtGn % | 106.9 | 80.5 | 104.5 | 85 | 94.2 | 85.5 | 99 | 82.5 |
| M100 (psi/MPa) | 268/1.85 | 289/1.99 | 307/2.12 | 300/2.07 | 333/2.30 | 318/2.19 | 394/2.72 | 433/2.99 |
| UTS (psi/MPa) | 717/4.94 | 698/4.81 | 856/5.90 | 918/6.33 | 917/6.32 | 841/5.80 | 895/6.17 | 779/5.37 |
| UE % | 415 | 338 | 441 | 459 | 571 | 415 | 372 | 307 |
| TnSet % | — | 7.5 | — | 8.5 | — | 10.0 | 11 | 12.5 |
| SpE | 0.358 | 0.203 | 0.331 | 0.222 | NA | 0.182 | 0.329 | 0.216 |

*First number is catalyst injection point, the second number is curing agent injectioin point expressed as L/D.

By mistake, 0.6 wt % SiH curative was used in the twin screw extruder in sample 3TS, and 0.7 wt % curative was used in the ring extruder in sample 3RE, but the different amounts of silicon hydride apparently did not affect the results.

M100 and ultimate tensile strength (UTS) are given in psi/MPa, and Elongation (UE %) and Tension Set (TnSet) are given in %.

The data demonstrates the capability of the 'B' screw design since the same mixing screw was used to produce TPV using three different catalyst systems. A different screw design was used, and is required, when each of these compositions are produced using a twin screw extruder. The data also suggests broad utility for the B screw design since the hardness of the thermoplastic vulcanizates provided in this example show a Shore A of about 60 to 71, and previous examples using the B screw profile show a Shore A hardness as low as about 10. Similar hardness was seen for the samples made with the twin screw extruder and the ring extruder, and no clear advantage was seen in Modulus, Tensile Strength and Tension Set. Elongation, overall, is slightly better for the samples processed in the twin screw extruder. Oil Swell Resistance (WtGn %) and Specific Energy (SpE) are significantly improved for the samples processed in the ring extruder.

EXAMPLE 7

In this example, the ring extruder was used to make some harder grade TPVs. It is generally considered to be easier to make the harder grade TPVs because more thermoplastic polymer (TP) is used, and phase inversion is easier, and in some cases, where more TP is used than rubber, the TP may be the continuous phase from the beginning of the process.

In the preparation of examples in Table 8, barrel location 23 was used for injection of the curative. Screw profile B was used, except for Exp. 27 which used the A screw profile.

The barrel was heated per EXAMPLE 1, except that barrels 2-6=210° C. (410° F.).

TABLE 8

| | Exp. No. | | | |
|---|---|---|---|---|
| | 25 | 26 | 27 | 28 |
| Homo PP, phr (Wt. %) | 223.9 (67.1) | 140.5 (58.4) | 182 (64.5) | 200 (66.7) |
| Wt. % PP[1] add after cure | 0 | 70.1 | 76.9 | 0 |
| Total Oil (phr) | 130.1 | 133.3 | 133.3 | 171 |
| EPDM | VX4779 | V3666 | V3666 | VX1696 |
| Cure Type | Phenolic Resin | Peroxide | Peroxide | Hydrosilation |
| curative (phr) | 4.2 | 3.25 | 3.25 | 3 |
| WtGn % | 42 | 63 | 56 | 48.5 |
| Surface roughness | 91 | 122 | 107 | 102 |
| Hard(Sh A(D)) | 95.8 (40D) | 89.5(26D) | 93.9(33.1D) | 93.1(31.3D) |
| UTS (psi/MPa) | 2651/18.28 | 1562/10.77 | 1932/13.32 | 1465/10.10 |
| M100 (psi/MPa) | 1212/8.36 | 810/5.58 | 1008/6.95 | 942/6.49 |
| UE % | 516 | 381 | 406 | 481 |
| TnSet % | 40 | 24 | 31.5 | 35 |
| SpE | 0.250 | 0.193 | 0.212 | 0.249 |
| RPM | 560 | 400 | 400 | 560 |
| Oil before cure, Wt. % | 10 | 25 | 25 | 10 |

[1]polypropylene pellets

For the samples using the resin cure system, all the materials were as described in EXAMPLE 1, except VX4779 rubber, extended with 90 phr oil was used. The materials for the hydrosilation cure were the same as described in EXAMPLE 4. The peroxide cure was DBPH/PAR 100# Peroxide from Rhein Chemie, with a co-agent PLC/(TAC)-50BC from Rhein Chemie, used at 3 phr. Irganox® 1010 stabilizer from Ciba Specialty Chemicals was used at 2 phr, and the rubber was EPDM V3666 with 75 phr oil extension from ExxonMobil Chemical Co. and the thermoplastic was PP F008F from Sunoco Inc. (Chemicals).

The results show that using the ring extruder, melting and mixing additional PP after cure is possible, and the data confirms that hard thermoplastic vulcanizates with commercially acceptable properties can be made using the ring extruder using various curing and catalyst systems.

What is claimed is:

1. A method for preparing a thermoplastic vulcanizate within a ring extruder having a length and a diameter defined by a length to diameter ratio of 15-100, the extruder including at least three screws having a length and including intermeshing elements disposed along the length to achieve a screw profile that has 3 to 17 meshes per unit of length to diameter of the extruder, and where the extruder includes at least two screws including blocking elements disposed in the first ¼ portion of the length of the extruder defined from the feed throat of the extruder to prevent cross-over of material and thereby create at least two mixing portions within the first ¼ portion of the extruder, the method comprising:
  i. charging thermoplastic polymer to the extruder;
  ii. charging vulcanizable polymer to the extruder;
  iii. charging curative for the vulcanizable polymer to the extruder;
  iv. melt mixing the thermoplastic polymer and curative within a first mixing portion of the first ¼ portion of the length of the extruder;
  v. masticating the vulcanizable polymer within a second mixing portion of the first ¼ portion of the length of the extruder, where said step of melt mixing the thermoplastic polymer and curative and said step of masticating the vulcanizable polymer occurs simultaneously;
  vi. preventing the cross-over of the curative and thermoplastic polymer contained in the first mixing portion to the vulcanizable polymer contained in the second mixing portion for at least a portion of the first ¼ portion of the length of the extruder by using the blocking elements;
  vii. melt mixing the curative, thermoplastic polymer, and vulcanizable polymer after said step vi and
  viii. dynamically vulcanizing the vulcanizable polymer after said step vi to thereby form a thermoplastic vulcanizate.

2. The method of claim 1, where the screw profile has 9 to 17 meshes/L/D.

3. The method of claim 1, wherein said curing agent is a silicon-hydride containing composition with a platinum catalyst.

4. The method of claim 1, wherein said curing agent is selected from the group consisting of phenolic resins and organic peroxide compositions and wherein said curing agent is added in the first 25% of the length of said first or second extruder.

5. The method of claim 1, where said steps of melt mixing and masticating takes place by rotating said screws at 100 to 1200 RPM and where said step of charging thermoplastic polymer and vulcanizable polymer takes place at a rate of 1.91-22.9 Kg/(Hr×cm$^2$ free cross sectional area).

6. The method of claim 1, where said steps of melt mixing and masticating takes place by rotating said screws at 500 to 850 RPM and where said step of charging thermoplastic polymer and vulcanizable polymer takes place at a rate of 9.54- 16.22 Kg/(Hr×cm$^2$ free cross sectional area).

7. The method of claim 1, further comprising the step of charging oil to the extruder within the first ¼ portion of the length of the extruder.

8. The method of claim 7, further comprising the step of charging oil to the extruder after said step of dynamically vulcanizing.

9. The method of claim 1, further comprising the step of charging additional thermoplastic polymer after said step of melt mixing the thermoplastic polymer and curative.

10. The method of claim 1, further comprising the step of charging additional thermoplastic polymer after said step of dynamically vulcanizing, and where the amount of thermoplastic polymer added is 2.4% to 85% of said thermoplastic vulcanizate.

11. The method of claim 10, further comprising multiple steps of charging an oil to the extruder.

12. the method of claim 11, where the oil is charged before, during, and after said step of dynamically vulcanizing.

13. The method of claim 12, where the amount of oil charged in said steps of charging oil results in an oil to thermoplastic polymer ratio in the thermoplastic vulcanizate of 160:1 to 1:20.

* * * * *

UNITED STATES PATENT AND TRADEMARK OFFICE
CERTIFICATE OF CORRECTION

PATENT NO.      : 7,655,728 B2
APPLICATION NO. : 11/167339
DATED           : February 2, 2010
INVENTOR(S)     : Nadella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this

Twenty-third Day of November, 2010

David J. Kappos
*Director of the United States Patent and Trademark Office*